(12) United States Patent
Kuo

(10) Patent No.: US 12,010,557 B2
(45) Date of Patent: Jun. 11, 2024

(54) METHOD AND APPARATUS FOR QUALITY OF SERVICE (QOS) INFORMATION MODIFICATION IN A WIRELESS COMMUNICATION SYSTEM

(71) Applicant: ASUSTek Computer Inc., Taipei (TW)

(72) Inventor: Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/483,383

(22) Filed: Sep. 23, 2021

(65) Prior Publication Data

US 2022/0095168 A1 Mar. 24, 2022

Related U.S. Application Data

(60) Provisional application No. 63/082,243, filed on Sep. 23, 2020, provisional application No. 63/082,226, filed on Sep. 23, 2020.

(51) Int. Cl.
*H04W 28/24* (2009.01)
*H04W 28/02* (2009.01)
*H04W 92/18* (2009.01)

(52) U.S. Cl.
CPC ....... *H04W 28/24* (2013.01); *H04W 28/0257* (2013.01); *H04W 28/0263* (2013.01); *H04W 28/0268* (2013.01); *H04W 92/18* (2013.01)

(58) Field of Classification Search
CPC ......... H04W 28/0263; H04W 28/0257; H04W 28/0268; H04W 28/24; H04W 88/04; H04W 92/18
See application file for complete search history.

(56) References Cited

U.S. PATENT DOCUMENTS

| | | | | |
|---|---|---|---|---|
| 11,770,825 | B2* | 9/2023 | Bae | H04W 72/56 370/329 |
| 2020/0053010 | A1* | 2/2020 | Huang-Fu | H04W 76/22 |
| 2020/0275305 | A1* | 8/2020 | Huang-Fu | H04W 28/0268 |
| 2021/0289391 | A1* | 9/2021 | Paladugu | H04L 47/2491 |
| 2021/0360742 | A1* | 11/2021 | Liao | H04W 28/09 |
| 2022/0240122 | A1* | 7/2022 | Liu | H04B 17/309 |
| 2022/0264503 | A1* | 8/2022 | Starsinic | H04W 8/20 |

(Continued)

FOREIGN PATENT DOCUMENTS

| | | | | |
|---|---|---|---|---|
| WO | WO-2020247764 | A1 * | 12/2020 | H04L 63/08 |
| WO | WO-2021239001 | A1 * | 12/2021 | H04W 28/24 |

(Continued)

OTHER PUBLICATIONS

European Search Report in corresponding EP Application No. 21198427.3, dated Feb. 21, 2022.

(Continued)

*Primary Examiner* — Mehmood B. Khan
(74) *Attorney, Agent, or Firm* — Skaar Ulbrich Macari, P.A.

(57) ABSTRACT

A method and device are disclosed from the perspective of a Remote User Equipment (UE) for modifying QoS information. In one embodiment, the method includes a Remote User Equipment (UE) transmitting a first message to a Relay UE for QoS information modification, wherein the first message includes at least one QoS rule and/or at least one QoS flow description associated with a Protocol Data Unit (PDU) session.

13 Claims, 14 Drawing Sheets

(56) References Cited

U.S. PATENT DOCUMENTS

| | | | | |
|---|---|---|---|---|
| 2022/0295337 A1* | 9/2022 | Kim | .................... | H04W 76/14 |
| 2022/0330084 A1* | 10/2022 | Li | ...................... | H04W 76/14 |
| 2022/0338205 A1* | 10/2022 | Lee | .................... | H04W 72/56 |
| 2023/0093178 A1* | 3/2023 | Guo | .................... | H04W 76/23 |
| | | | | 370/310 |
| 2023/0096462 A1* | 3/2023 | Turyagyenda | ........ | H04W 24/08 |
| | | | | 370/329 |
| 2023/0262793 A1* | 8/2023 | Deng | .................. | H04W 40/12 |
| | | | | 370/329 |
| 2023/0379765 A1* | 11/2023 | Deng | .................. | H04W 40/22 |

FOREIGN PATENT DOCUMENTS

| | | | | |
|---|---|---|---|---|
| WO | WO-2022150538 A1 * | 7/2022 | ............ | H04W 12/06 |
| WO | WO-2022161148 A1 * | 8/2022 | ............ | H04W 28/24 |
| WO | WO-2022177885 A1 * | 8/2022 | ......... | H04L 61/5007 |

OTHER PUBLICATIONS

Futurewei, "QoS Control with Sidelink Relay", Agenda Item 8.7.3, Discussion and Decision, R2-2006724, 3GPP TSG-RAN WG2 Meeting #111e, Electronic Meeting, Aug. 17-28, 2020.

Huawei, HiSilicon, "KI#4, Sol#9: Update on protocol stacks for Layer 2 UE-to—UE Relay", Agenda Item: 8.8, S2-2005643, 3GPP TSG-WG SA2 Meeting #140E e-meeting, Elbonia, Aug. 19-Sep. 1, 2020.

Office Action to the corresponding Korean Patent Application rendered by the Korean Intellectual Property Office (KIPO) on Mar. 25, 2024, 22 pages (including English translation).

OPPO, S2-2005451, KI#3, New Sol: A merged solution for solution 24 and 25, 3GPP TSG SA WG2 #140E; Aug. 13, 2020; 4 pages.

3GPP, TS24.501 v16.5.1, Non-Access-Stratum (NAS) protocol for 5G System (5GS); Stage 3; Jul. 17, 2020; 709 pages.

* cited by examiner

| IEI | Information Element | Type/Reference | Presence | Format | Length |
|---|---|---|---|---|---|
| | Extended protocol discriminator | Extended protocol discriminator 9.2 | M | V | 1 |
| | PDU session ID | PDU session identity 9.4 | M | V | 1 |
| | PTI | Procedure transaction identity 9.6 | M | V | 1 |
| | PDU SESSION MODIFICATION REQUEST message identity | Message type 9.7 | M | V | 1 |
| 28 | 5GSM capability | 5GSM capability 9.11.4.1 | O | TLV | 3-15 |
| 59 | 5GSM cause | 5GSM cause 9.11.4.2 | O | TV | 2 |
| 55 | Maximum number of supported packet filters | Maximum number of supported packet filters 9.11.4.9 | O | TV | 3 |
| B- | Always-on PDU session requested | Always-on PDU session requested 9.11.4.4 | O | TV | 1 |
| 13 | Integrity protection maximum data rate | Integrity protection maximum data rate 9.11.4.7 | O | TV | 3 |
| 7A | Requested QoS rules | QoS rules 9.11.4.13 | O | TLV-E | 7-65538 |
| 79 | Requested QoS flow descriptions | QoS flow descriptions 9.11.4.12 | O | TLV-E | 6-65538 |
| 75 | Mapped EPS bearer contexts | Mapped EPS bearer contexts 9.11.4.8 | O | TLV-E | 7-65538 |
| 7B | Extended protocol configuration options | Extended protocol configuration options 9.11.4.6 | O | TLV-E | 4-65538 |
| 7C | Port management information container | Port management information container 9.11.4.27 | O | TLV-E | 3-65538 |
| 66 | IP header compression configuration | Header compression configuration 9.11.4.24 | O | TLV | 5-257 |
| 1F | Ethernet header compression configuration | Ethernet header compression configuration 9.11.4.28 | O | TLV | 3 |

METHOD AND APPARATUS FOR QUALITY OF SERVICE (QOS) INFORMATION MODIFICATION IN A WIRELESS COMMUNICATION SYSTEM

CROSS-REFERENCE TO RELATED APPLICATIONS

The present Application claims the benefits of U.S. Provisional Patent Application Ser. No. 63/082,226 filed on Sep. 23, 2020 and U.S. Provisional Patent Application Ser. No. 63/082,243 filed on Sep. 23, 2020, the entire disclosure of which is incorporated herein in its entirety by reference.

FIELD

This disclosure generally relates to wireless communication networks, and more particularly, to a method and apparatus for Quality of Service (QoS) information modification in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed from the perspective of a Remote User Equipment (UE) for modifying QoS information. In one embodiment, the method includes a Remote User Equipment (UE) transmitting a first message to a Relay UE for QoS information modification, wherein the first message includes at least one QoS rule and/or at least one QoS flow description associated with a Protocol Data Unit (PDU) session.

BRIEF DESCRIPTION OF THE DRAWINGS

FIG. 13 is a reproduction of Table 8.3.7.1.1 of 3GPP TS 24.501 V16.5.1.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 23.303 V16.0.0, "Proximity-based services (ProSe); Stage 2 (Release 16)"; TR 23.752 V0.4.0, "Study on system enhancement for Proximity based services (ProSe) in the 5G System (5GS) (Release 17)"; TS 23.287 V16.2.0, "Architecture enhancements for 5G System (5GS) to support Vehicle-to-Everything (V2X) services (Release 16)"; TS 23.502 V16.5.1, "Procedures for the 5G System (5GS); Stage 2 (Release 16)"; TS 24.501 V16.5.1, "Non-Access-Stratum (NAS) protocol for 5G System (5GS); Stage 3 (Release 16)"; and TS 23.501 v16.5.1, "System architecture for the 5G System (5GS); Stage 2 (Release 16)". The standards and documents listed above are hereby expressly incorporated by reference in their entirety.

Figure 1:
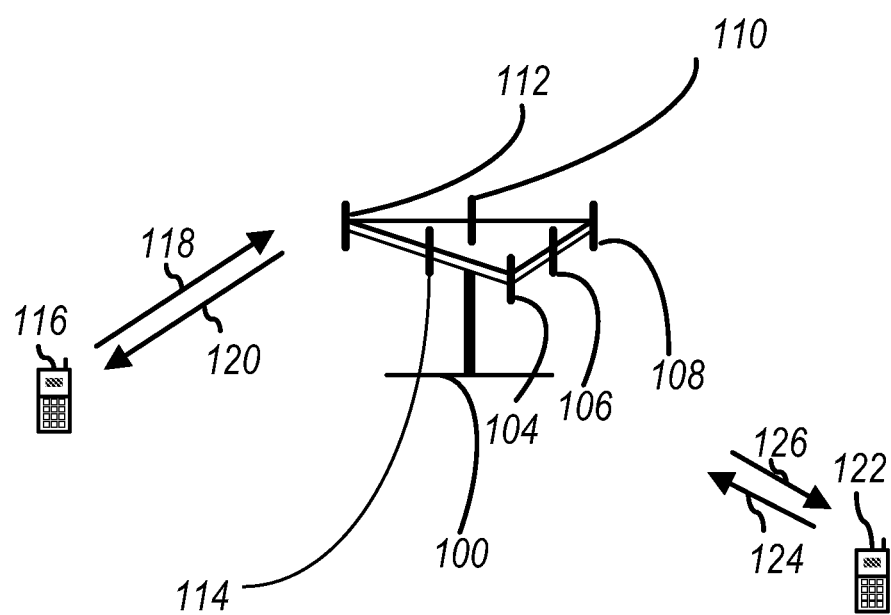
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
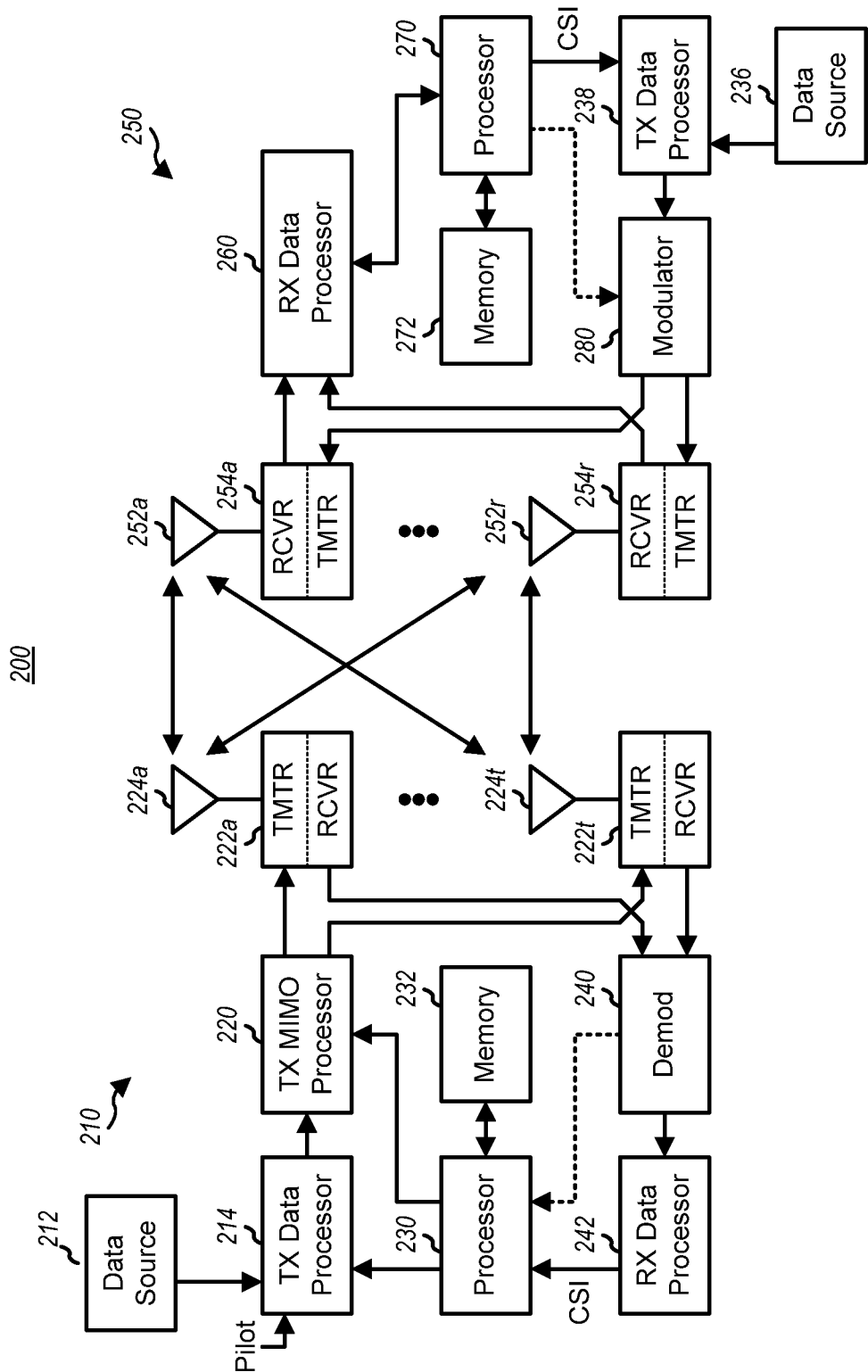
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
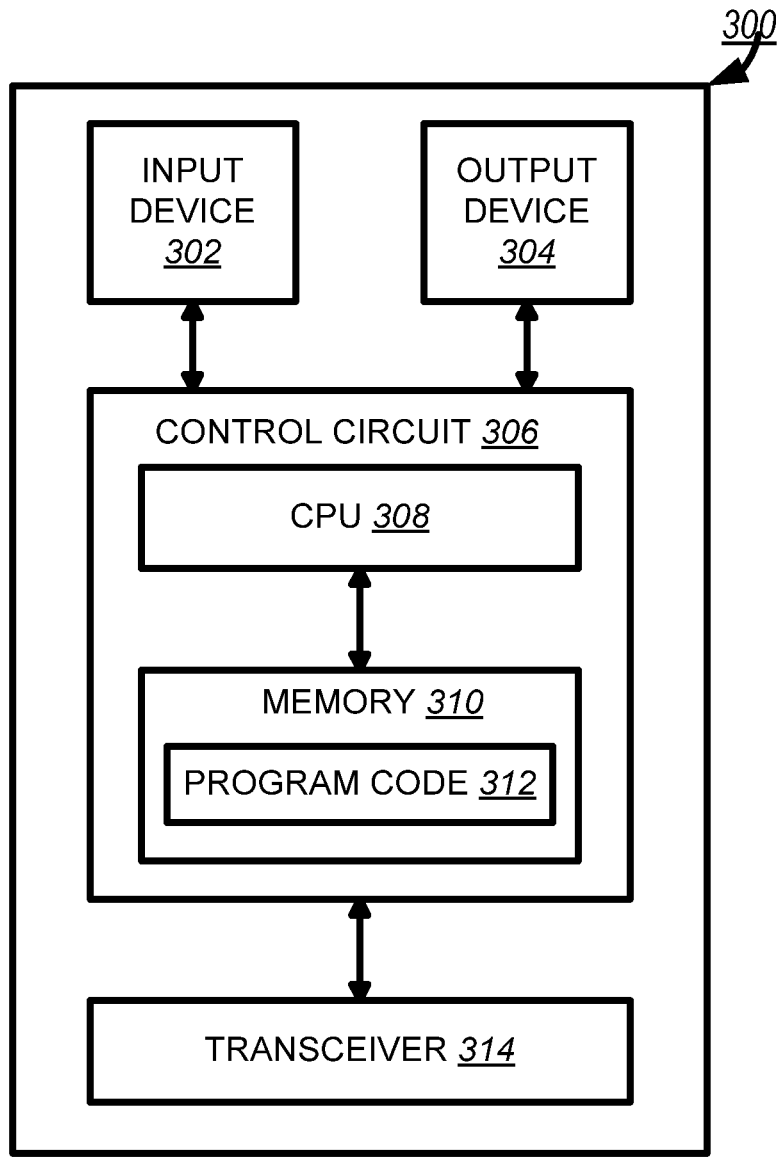
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
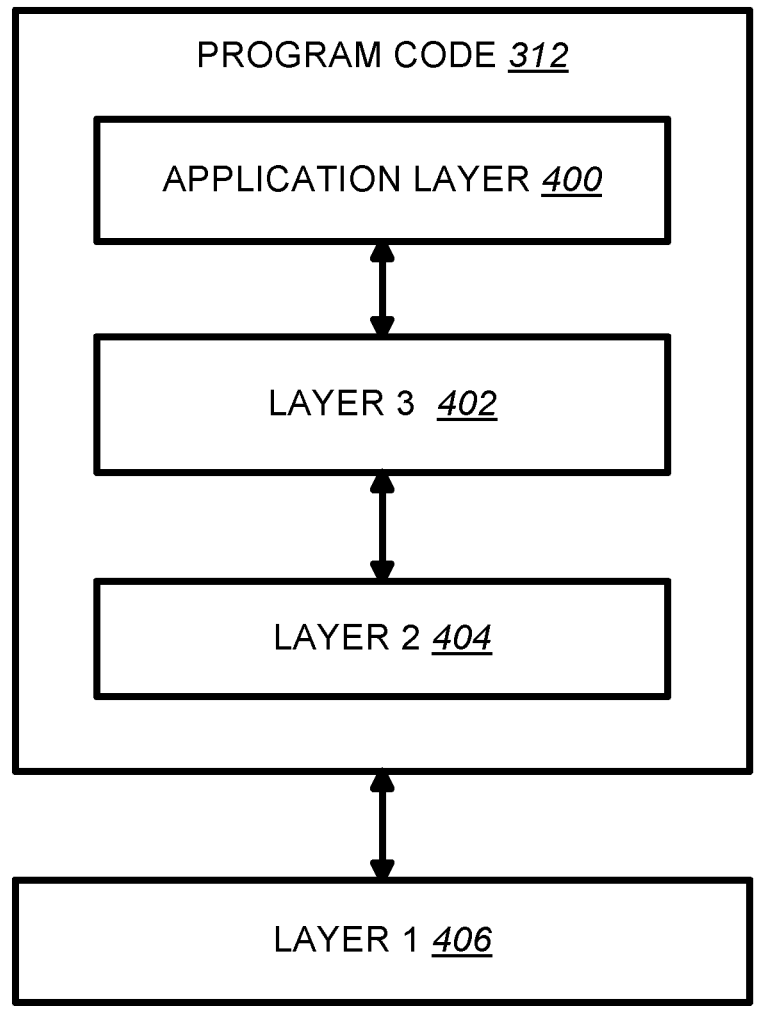
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 23.303 specifies UE-to-Network Relay Discovery for public safety use. Both Model A discovery and Model B discovery are supported for discovering a UE-to-Network Relay.

3GPP TR 23.752 proposes to support UE-to-Network Relay and related solutions for Release 17 as follows:

6.16 Solution #16: Service Authorization and Provisioning for UE-To-Network Relay 6.16.1 General The procedures for service authorization and provisioning is based on the V2X Procedures for Service Authorization and Provisioning as specified in clause 6.2 of TS 23.287 [5].

Editor's note: This solution is used for Layer-3 UE-to-Network Relay. Whether this solution can also be used for Layer-2 UE-to-Network Relay is FFS.

6.16.2 PCF Based Service Authorization and Provisioning to the UE-To-Network Relay For PCF based Service Authorization and Provisioning to the UE-to-Network Relay, the Registration procedures as defined in clause 4.2.2.2 of TS 23.502 [8], UE Policy Association Establishment procedure as defined in clause 4.16.11 of TS 23.502 [8] and UE Policy Association Modification procedure as defined in clause 4.16.12 of TS 23.502 [8] apply with the following additions:

For UE-to-Network Relay:
The UE indicates UE-to-Network Relay capability in the Registration Request message.
The PCF determines the UE-to-Network Relay parameters for the UE-to-Network Relay and provides them to the UE-to-Network Relay as described in solution #17.

For Remote UE:
The UE indicates UE-to-Network Relay Access capability in the Registration Request message.
The PCF determines the parameters for the Remote UE to use a UE-to-Network Relay and provides them to the Remote UE as described in solution #17.

6.16.3 Authorization and Provisioning Parameters for UE-To-Network Relay

The following UE-to-Network Relay parameters are provided to the UE-to-Network Relay:
1) Authorisation policy for acting as a UE-to-Network Relay:
   PLMNs in which the UE is authorized to relay traffic for Remote UEs.
2) UE-to-Network Relay Discovery policy/parameters:
   UE-to-Network Relay Service Code or Service ID which identifies a connectivity service that the UE-to-Network Relay provides.
   The associated PDU session parameters (S-NSSAI, DNN, SSC mode, etc.) to be used for relayed traffic for each UE-to-Network Relay Service Code or Service ID.
   NOTE 1: Whether the associated PDU session parameters is included depends on the UE-to-Network Relay Discovery solutions. For example, if the associated PDU session parameters can be broadcasted with Relay Service Code in PC5 interface, these parameters may not need for provisioning procedure.
   NOTE 2: The UE-to-Network Relay's Configured NSSAI includes the S-NSSAIs needed to support relaying traffic for the associated Service code or Service ID.
   Editor's note: Details of UE-to-Network Relay slicing configuration update aspects are FFS.
   Security related parameters for UE-to-Network Relay Discovery for each UE-to-Network Relay Service Code or Service ID.
   NOTE 3: Further details on security requirements will be specified in SA WG3.

The following UE-to-Network Relay parameters are provided to the Remote UE:
1) Authorisation policy for acting as a Remote UE:
   Indicates whether the UE is authorised to use UE-to-Network Relay.
2) UE-to-Network Relay Discovery policy/parameters as provided to UE-to-Network Relay;
   Authorized UE-to-Network Relay Service Code/ID list.
   The associated PDU session parameters (S-NSSAI, DNN, SSC mode, etc.) for each UE-to-Network Relay Service Code or Service ID.
   NOTE 4: Whether the associated PDU session parameters is included depends on the UE-to-Network Relay Discovery solutions. For example, if the associated PDU session parameters can be broadcasted with Relay Service Code in PC5 interface, these parameters may not need for provisioning procedure.
   UE-to-Network Relay selection policy.
   Editor's note: Details of UE-to-Network Relay selection policy are FFS.
   NOTE 5: In this clause, only UE-to-Network Relay service specific parameters are specified. All other parameters used for general Authorization and Provisioning parameters (e.g. Radio parameters for discovery or communication) will be defined by solutions for KI 8.
   NOTE 6: This solution does not support the case when the NW relay is out-of-coverage or out-of-box operation required by public safety.

[ . . . .]

6.24 Solution #24: End-To-End QoS Support for Layer-3 UE-to-Network Relay 6.24.1 General Description This solution addresses Key Issue #3 "Support of UE-to-Network Relay". Specifically, this solution addresses the aspects on "How to support end-to-end requirements between Remote UE and the network via a UE-to-Network Relay, including QoS (such as data rate, reliability, latency)" and "How the network allows and controls the QoS requirement for 5G ProSe UE-to-NW relay."

In Layer 3 UE-to-NW relay solution (Solution #6), the Remote UE's data flow is served by the Relay UE's PDU Session. As the UE-to-Network relay path comprises of two legs (PC5 and Uu) as shown in figure 6.24.1-1 below, the end-to-end QoS can be met only when the QoS requirements are properly split and satisfied over the two legs respectively.

Figure 5:
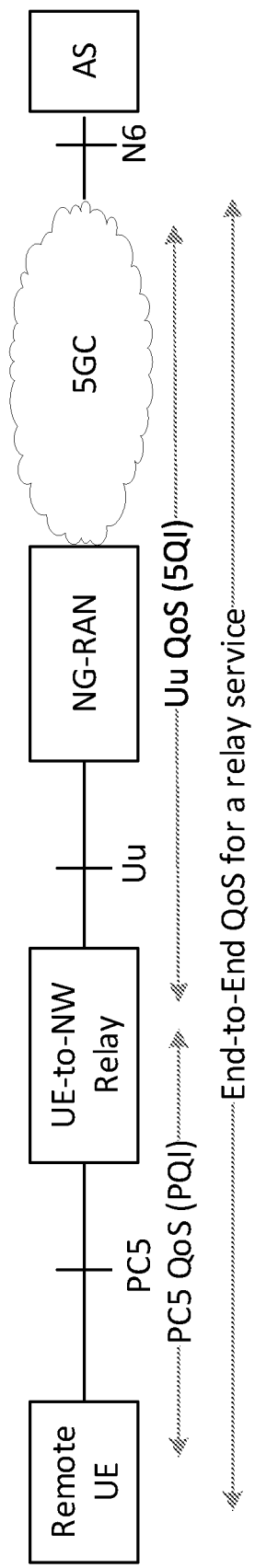
FIG. 5 is a reproduction of Figure 6.24.1-1 of 3GPP TR 23.752 V0.4.0.
Figure 6:
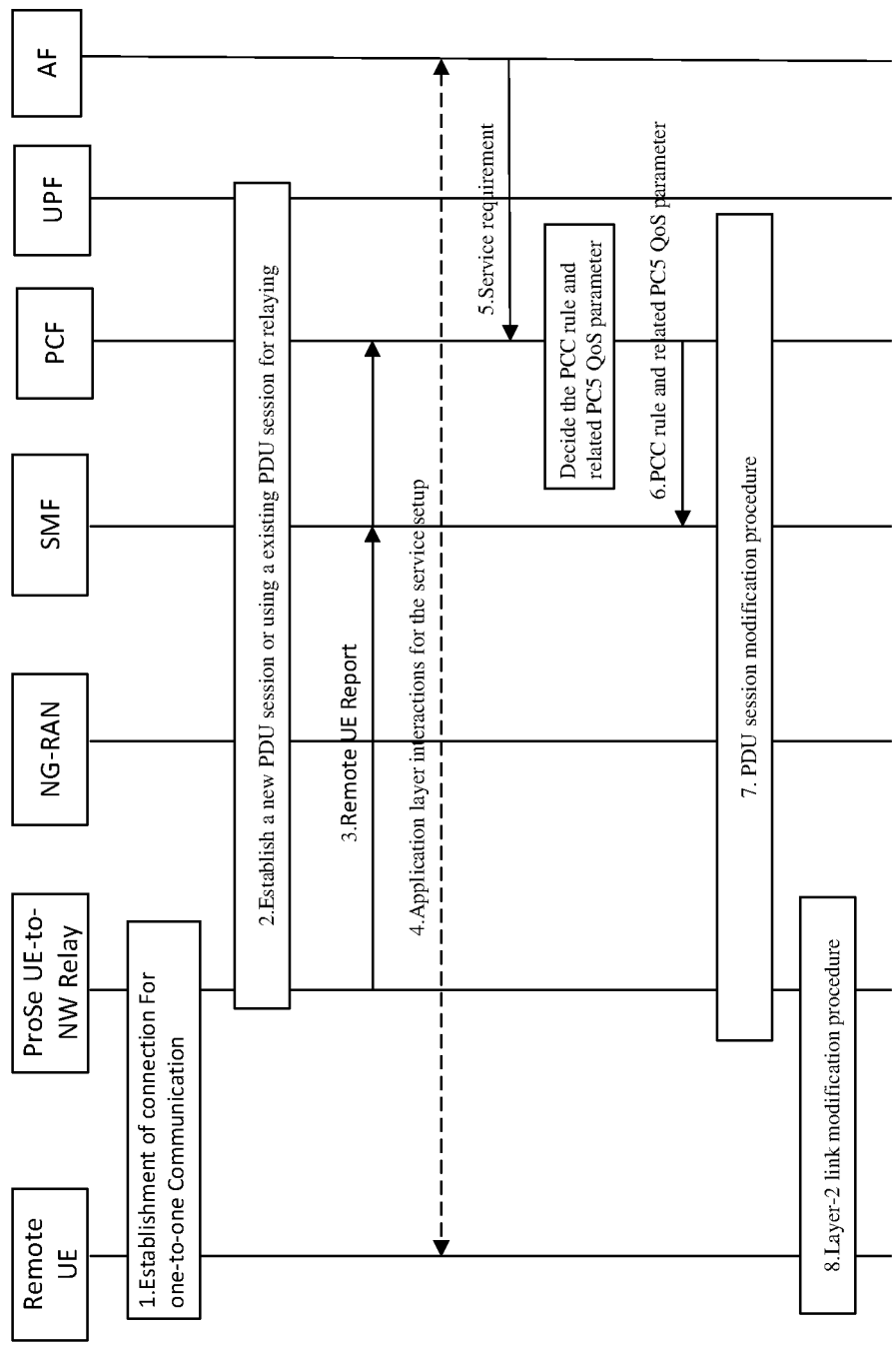
FIG. 6 is a reproduction of Figure 6.25.1-1 of 3GPP TR 23.752 V0.4.0.

[Figure 6.24.1-1 of 3GPP TR 23.752 V0.4.0, entitled "End-to-End QoS split for Layer 3 UE-to-Network Relay solution", is reproduced as FIG. 5]

The QoS requirements on the PC5 link are controlled with PC5 QoS rules and PC5 QoS parameters (PQI, GFBR, MFBR, PC5 LINK-AMBR, Range, etc) as specified in clause 5.4 of TS 23.287 [5]. The QoS requirements on the Uu link are controlled via with 5G QoS rules and 5G QoS parameters (5QI, GFBR, MFBR, etc) as specified in clause 5.7 of TS 23.501 [6]. The Uu leg's QoS is associated with the PDU Session established by the UE-to-Network Relay, and therefore the procedure as defined in TS 23.502 [8] clause 4.3.2 and 4.3.3 applies. The SMF of the UE-to-Network Relay would provide the corresponding QoS rules and flow level QoS parameters to the UE-to-Network Relay.

As explained above, the UE-to-Network Relay needs to translate the Uu QoS information into the corresponding PC5 QoS parameters in order to achieve the proper end-to-end QoS. Since the Remote UE and the UE-to-Network Relay uses PC5 unicast communication mode, most of the flow level QoS parameters can be directly reused. The only parameter that requires assistance in the translation is the mapping of 5QIs and PQIs. It is therefore necessary that the UE-to-Network Relay to be configured with the proper mapping information.

NOTE: The UE-to-Network Relay can be configured with a per Relay Service Code based mapping of 5QIs and PQIs.

Based on this information received form SMF, the UE-to-Network Relay establishes corresponding PC5 QoS Flows, using the procedure defined in TS 23.287 [5] clause 6.3.3.4. There can be a 1-to-1 mapping of the PC5 QoS Flow and the Uu QoS Flow for the Remote UE. In case that the Remote UE requested dedicated PC5 QoS Flows when establishing the L2 Link over PC5, the UE-to-Network can map the PC5 QoS requirements into Uu QoS requirements and perform the UE requested PDU session Modification as defined in TS 23.502 [8] clause 4.3.3.

6.24.2 Enhancements to Support Dynamic QoS Handling

As shown in figure 6.24.1-1, the end-to-end connection from the Remote UE to the AS involves two over-the-air links, i.e. Uu and PC5. Therefore, to meet the PDB for a particular service, the AN PDB utilized by the NG-RAN needs to be reduced, in order to give some budgets for the PC5 link. Note that this is independent of whether L2 or L3 Relay architecture is used. One way to achieve this without affecting the NG-RAN is for the SMF to modify the PDB signalled to the NG-RAN in the QoS Profile for the QoS Flows of the Remote UE's traffic. SMF follows the PCC rules (if it is PCF determined) or based on local configuration to deduct the PDB. When dynamic PCC control is supported, the SMF can base on the PCC rules to determine the PDB to use. Otherwise, SMF can base on pre-configuration, e.g. using DNN and/or S-NSSAI, to determine if and how to modify the PDB.

When dynamic PCC control is supported, it is possible that the AF may be able to request certain QoS handling of the traffic when the Remote UE initiated a session. This can be achieved by using the feature as defined in TS 23.503 [18] clause 6.1.3.22. The AF is able to locate the UE-to-Network Relay's PCF using the procedure as defined in TS 23.503 [18] clause 6.1.1.2, since the Remote UE uses an address belonging to the UE-to-Network Relay's PDU session. The PCF can generate corresponding PCC rules, and the SMF in turn generate the QoS rules and flow level QoS parameters and signal to the UE-to-Network Relay using PDU Session Modification procedure. The UE-to-Network Relay then uses the L2 Link Modification procedure defined in TS 23.287 [5] clause 6.3.3.4 to set up the related PC5 QoS flows.

6.24.2 Procedures

Existing procedures defined in TS 23.502 [8] and TS 23.287 [5] can be used to manage the QoS flows and PC5 QoS flows to serve the Remote UE.

6.24.3 Impacts on Services, Entities and Interfaces

The solution has impacts in the following entities:

SMF:
  SMF optionally supports modifying the PDB for a QoS Flow serving the Remote UE based on either PCC rules or pre-configuration.

UE:
  5G ProSe UE-to-Network Relay supports the mapping of Uu flow level QoS parameters to PC5 QoS parameters, including the mapping of 5QIs to PQIs, based on either configuration or standardized mapping.

6.25 Solution #25: QoS Handling for Layer-3 UE-To-Network Relay 6.25.1 Description This is a solution for Key Issue #3, UE-to-Network Relay. especially it's used for the QoS control of Layer-3 UE-to-Network Relay.

For a Remote UE accessing network via UE-to-Network Relay, the QoS control between Remote UE and UPF includes two parts: one part is the QoS control for the connection between remote UE and UE-to-Network Relay, the other part is the QoS control for the connection between UE-to-Network Relay and UPF. In this solution PCF is responsible to set the QoS parameters between UE and UE-to-Network Relay, (we call it "PC5 QoS parameters"), and the QoS parameters between UE-to-Network Relay and UPF (we call it "Uu QoS parameters") separately to support the QoS requirement between Remote UE and UPF.

For PC5 interface, when standardized PQI is used, the PC5 QoS parameters includes PQI and other optional QoS parameters, e.g. GFBR. When non-standardized PQI is used, the whole set of PC5 QoS characteristics is also included. PCF ensures the PDB associated with the 5QI in the Uu QoS parameters and the PDB associated with the PQI in the PC5 QoS parameters supports the PDB between Remote UE and UPF. PCF also ensures other QoS parameters/QoS characteristics in the Uu QoS parameters and PC5 QoS parameters are compatible, e.g. have the same value.

The UE-to-Network Relay and Remote UE are pre-configured with authorized service(s) and the related PC5 QoS parameters. These can be provided by PCF during provisioning procedure. PCF may also provide default PC5 QoS parameters to NW Relay and Remote UE, this can be used for the out of coverage Remote UE or for the applications which is not frequently used.

When a Remote UE want to use the service offered by an AF through 3GPP network, it selects a UE-to-Network Relay and establishes a PC5 connection between Remote UE and NW Relay, if the Remote UE doesn't have the PC5 QoS parameters of the service, a default PC5 QoS Flow is setup using the default PC5 QoS parameters in the provisioning information.

UE-to-Network Relay also setup a corresponding PDU session for relaying, e.g. based on the S-NSSAI, DNN requested by remote UE. After the IP address/prefix allocation, UE-to-Network Relay reports the IP info of remote UE to SMF, PCF also receives the IP info of remote UE from SMF.

If the Remote UE doesn't have the PC5 QoS parameters of the service, After the PC5 connection and the related PDU session setup, remote UE interacts with AF for the application layer controlling messages required by the service, the interaction is transferred through the default PC5 QoS Flow and the default QoS Flow of the PDU session. Then AF provides the service requirement to PCF. As PCF has received the remote UE report from SMF, PCF knows the target UE requested by AF is a remote UE, PCF generates PCC rules (for QoS control on Uu) and the PC5 QoS parameters (for QoS control on PC5), the PCF decision for example could base on the received service requirements from AF and the operator policies and the charging rate of Uu and PC5.

6.25.2 Procedures

[Figure 6.25.1-1 of 3GPP TR 23.752 V0.4.0, entitled "QoS control for L3 UE-to-Network Relay", is reproduced as FIG. 6]

1. When a Remote UE want to use the service offered by an AF through 3GPP network, it selects a UE-to-Network Relay and establishes a PC5 connection between Remote UE and NW Relay, it's same as the PC5 part of step3 described in clause 6.6.2. In this step, if the Remote UE doesn't have the PC5 QoS parameters of the service, a default PC5 QoS Flow is setup using the default PC5 QoS parameters in the provisioning information.
2. UE-to-Network Relay sets up a corresponding PDU session or uses an existing PDU session for relaying, e.g. based on the S-NSSAI, DNN requested by remote UE.
3. After the IP address/prefix allocation, UE-to-Network Relay reports the IP info of remote UE to SMF, SMF also forwards the received report to PCF.
4. If the Remote UE doesn't have the PC5 QoS parameters of the service, Remote UE interacts with AF for the application layer controlling messages required by the service, the interaction is transferred through the default PC5 QoS Flow and the default QoS Flow of the PDU session.
5. Since the address used by Remote UE belongs to the UE-to-Network Relay's PDU session, AF is able to locate the UE-to-Network Relay's PCF and provides the service requirement to PCF.
6. PCF knows the target UE requested by AF is a remote UE, e.g. by the IP info provided by AF and the IP info of remote UE received from SMF. PCF generates PCC rules (for QoS control on Uu) and the PC5 QoS parameters (for QoS control on PC5), the PCF decision for example could base on the received service requirements from AF and the operator policies and the charging rate of Uu and PC5. PCF provides PCC decision to SMF.
7. Based on the PCC rules received from PCF, SMF may decides to setup a new QoS Flow or modify an existing QoS Flow for the PDU session. SMF generates QoS rule to be enforced at UE-to-Network Relay and the QoS profile to be enforced at RAN for the QoS control of Uu part. PDU session modification procedure is performed. The PC5 QoS parameters is also provided to UE-to-Network Relay together with the related QoS rule.
8. UE-to-Network Relay uses the PC5 QoS parameters received from CN to initiate the Layer-2 link modification procedure as described in TS 23.287 [5].

6.25.3 Impacts on Services, Entities and Interfaces

PCF generates PCC rules (for QoS control on Uu) and the PC5 QoS parameters (for QoS control on PC5).

UE-to-Network Relay modify the Layer-2 link based on the PC5 QoS parameters received from CN.

3GPP TS 23.287 specifies Authorization and Provisioning for Vehicle-to-Everything (V2X) communications, QoS handling for V2X communication, Layer-2 link establishment over PC5 reference point, and layer-2 link modification procedure as follows:

5.1.2 Authorization and Provisioning for V2X Communications Over PC5 Reference Point 5.1.2.1 Policy/Parameter Provisioning The following sets of information for V2X communications over PC5 reference point is provisioned to the UE:

[ . . . . ]

6) Policy/parameters when NR PC5 is selected:
  The mapping of V2X service types (e.g. PSIDs or ITS-AIDS) to V2X frequencies with Geographical Area(s).
  The mapping of Destination Layer-2 ID(s) and the V2X service types, e.g. PSIDs or ITS-AIDs of the V2X application for broadcast.
  The mapping of Destination Layer-2 ID(s) and the V2X service types, e.g. PSIDs or ITS-AIDs of the V2X application for groupcast.
  The mapping of default Destination Layer-2 ID(s) for initial signalling to establish unicast connection and the V2X service types, e.g. PSIDs or ITS-AIDS of the V2X application.
NOTE 3: The same default Destination Layer-2 ID for unicast initial signalling can be mapped to more than one V2X service types. In the case where different V2X services are mapped to distinct default Destination Layer-2 IDs, when the UE intends to establish a single unicast link that can be used for more than one V2X service types, the UE can select any of the default Destination Layer-2 IDs to use for the initial signalling.
PC5 QoS mapping configuration:
  Input from V2X application layer:
    V2X service type (e.g. PSID or ITS-AID).
    (Optional) V2X Application Requirements for the V2X service type, e.g. priority requirement, reliability requirement, delay requirement, range requirement.
NOTE 4: Details of V2X Application Requirements for the V2X service type is up to implementation and out of scope of this specification.
  Output:
    PC5 QoS parameters defined in clause 5.4.2 (i.e. PQI and conditionally other parameters such as MFBR/GFBR, etc.).
    AS layer configurations (see TS 38.331 [15]), e.g. the mapping of PC5 QoS profile(s) to radio bearer(s), when the UE is "not served by E-UTRA" and "not served by NR".
    The PC5 QoS profile contains PC5 QoS parameters described in clause 5.4.2, and value for the QoS characteristics regarding Priority Level, Averaging Window, Maximum Data Burst Volume if default value is not used as defined in Table 5.4.4-1.

[ . . . . ]

5.4.1 QoS Handling for V2X Communication Over PC5 Reference Point 5.4.1.1 QoS Model 5.4.1.1.1 General Overview For LTE based PC5, the QoS handling is defined in TS 23.285 [8], based on ProSe Per-Packet Priority (PPPP) and ProSe Per-Packet Reliability (PPPR).

For NR based PC5, a QoS model similar to that defined in TS 23.501 [6] for Uu reference point is used, i.e. based on 5QIs, with additional parameter of Range as described in clauses 5.4.2, 5.4.3 and 5.4.4. For the V2X communication over NR based PC5 reference point, a PC5 QoS Flow is associated with a PC5 QoS Rule and the PC5 QoS parameters as defined in clause 5.4.2. A set of standardized PC5

5QIs (PQI) are defined in clause 5.4.4. The UE may be configured with a set of default PC5 QoS parameters to use for the V2X service types, as defined in clause 5.1.2.1. For NR based unicast, groupcast and broadcast PC5 communication, Per-flow QoS model for PC5 QoS management shall be applied. Figure 5.4.1.1.1-1 illustrates an example mapping of Per-flow QoS model for NR PC5. Details of PC5 QoS Rules and PFI related operations are described in clauses 5.4.1.1.2 and 5.4.1.1.3.

Figure 7:
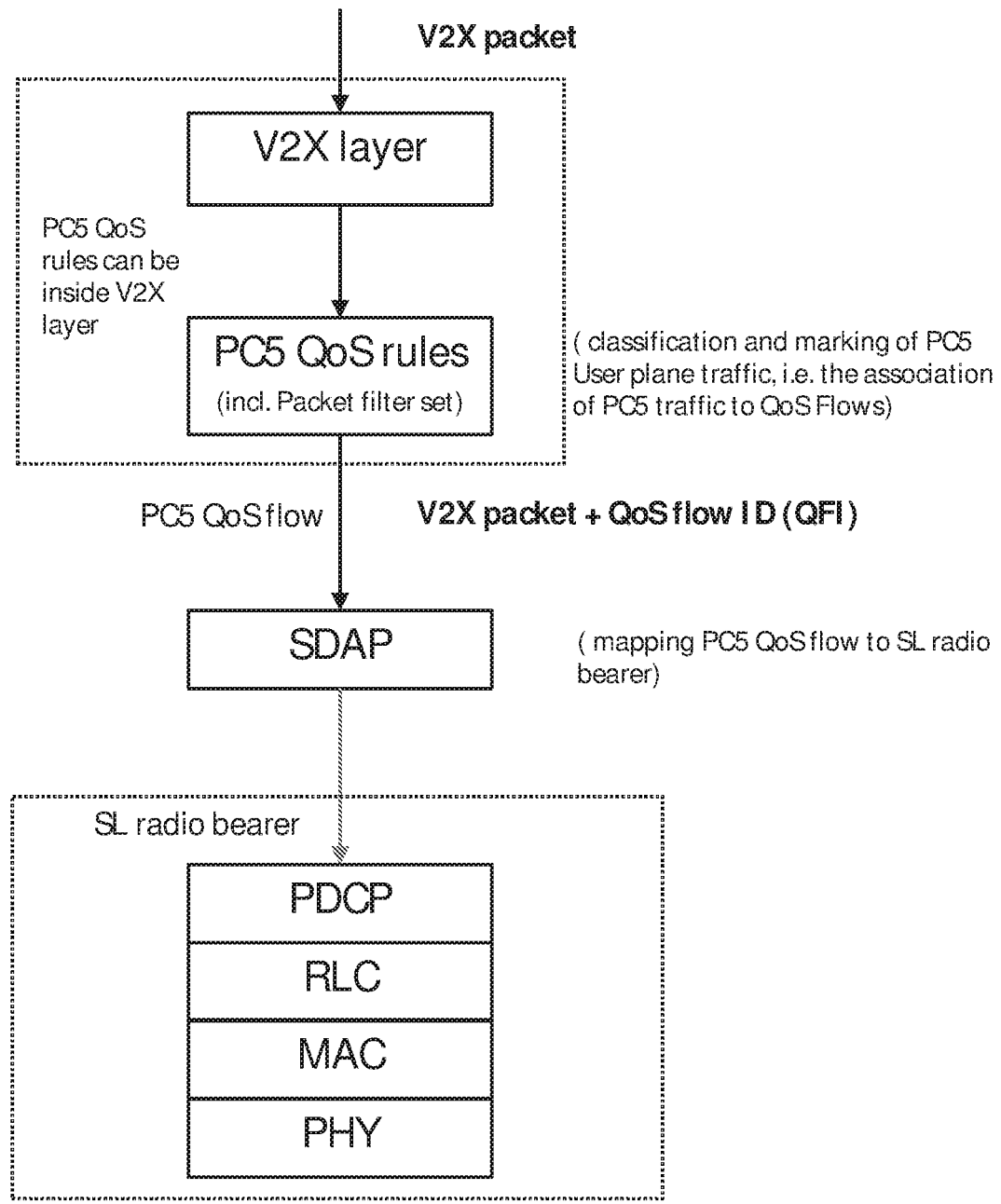
FIG. 7 is a reproduction of Figure 5.4.1.1.1-1 of 3GPP TS 23.287 V16.2.0.

[Figure 5.4.1.1.1-1 of 3GPP TS 23.287 V16.2.0, entitled "Per-Flow PC5 QoS Model for NR PC5", is reproduced as FIG. 7]

The following principles apply when the V2X communication is carried over PC5 reference point:

- Application layer may set the V2X Application Requirements for the V2X communication, using either TS 23.285 [8] defined PPPP and PPPR model or the PQI and Range model as described in clause 5.4.4. Depending on the type of PC5 reference point, i.e. LTE based or NR based, selected for the transmission, the UE may map the application layer provided V2X Application Requirements to the suitable QoS parameters to be passed to the lower layer. The mapping between the two QoS models is defined in clause 5.4.2. For V2X communication over NR based PC5, different V2X packets may require different QoS treatments. In that case, the V2X packets shall be sent from the V2X layer to the Access Stratum layer within PC5 QoS Flows identified by different PFIs.
- When groupcast mode of V2X communication over NR based PC5 is used, a Range parameter is associated with the QoS parameters for the V2X communication. The Range may be provided by V2X application layer or use a default value mapped from the V2X service type based on configuration as defined in clause 5.1.2.1. The Range indicates the minimum distance that the QoS parameters need to be fulfilled. The Range parameter is passed to AS layer together with the QoS parameters for dynamic control.
- NR based PC5 supports three types of communication mode, i.e. broadcast, groupcast, and unicast. The QoS handling of these different modes are described in clauses 5.4.1.2 to 5.4.1.4.
- The UE may handle broadcast, groupcast, and unicast traffic by taking all their priorities, e.g. indicated by PQIs, into account.
- For broadcast and groupcast modes of V2X communication over NR based PC5, standardized PQI values are applied by the UE, as there is no signalling over PC5 reference point for these cases.
- When network scheduled operation mode is used, the UE-PC5-AMBR for NR based PC5 applies to all types of communication modes, and is used by NG-RAN for capping the UE's NR based PC5 transmission in the resources management. The UE-PC5-AMBR shall be set to the sum of the aggregate maximum bit rate of all types of communication (i.e. unicast, groupcast and broadcast modes) over PC5 reference point.

5.4.1.1.2 Deriving PC5 QoS Parameters and Assigning PFI for PC5 QoS Flow

The following description applies to for both network scheduled operation mode and UE autonomous resources selection mode.

When service data or request from the V2X application layer is received, the UE determines if there is any existing PC5 QoS Flow matching the service data or request, i.e. based on the PC5 QoS Rules for the existing PC5 QoS Flow(s).

If there is no PC5 QoS Flow matching the service data or request, the UE derives PC5 QoS parameters based on the V2X Application Requirements provided by the V2X application layer (if available) and the V2X service type (e.g. PSID or ITS-AID) according to the PC5 QoS mapping configuration defined in clause 5.1.2.1 and performs the following:

- If there is no existing PC5 QoS Flow that fulfils the derived PC5 QoS parameters:
  - The UE creates a new PC5 QoS Flow for the derived PC5 QoS parameters; and
  - The UE then assigns a PFI and derives PC5 QoS Rule for this PC5 QoS Flow.
- Otherwise, the UE updates the PC5 Packet Filter Set in the PC5 QoS Rule for such PC5 QoS Flow.

For V2X communication over NR PC5 reference point, the PC5 QoS Flow is the finest granularity of QoS differentiation in the same destination identified by Destination Layer-2 ID. User Plane traffic with the same PFI receives the same traffic forwarding treatment (e.g. scheduling, admission threshold). The PFI is unique within a same destination.

5.4.1.1.3 Handling of PC5 QoS Flows Based on PC5 QoS Rules

For each communication mode (e.g. broadcast, groupcast, unicast), the UE maintains the mappings of PFIs to the PC5 QoS Context and PC5 QoS Rules per destination identified by Destination Layer-2 ID. A PC5 QoS Context includes PC5 QoS parameters (e.g. PQI and Range) and the V2X service type (e.g. PSID or ITS-AID). When the UE assigns a new PFI for V2X service type, the UE stores it with the corresponding PC5 QoS Context and PC5 QoS Rules for the destination. When the UE releases the PFI, the UE removes the corresponding PC5 QoS Context and PC5 QoS Rules for the destination. For unicast, the Unicast Link Profile defined in clause 5.2.1.4 contains addition information mapped from PFI for unicast operation.

The PC5 QoS Rule contains the PFI of the associated PC5 QoS Flow, a precedence value, and a PC5 Packet Filter Set as defined in clause 5.4.1.1.4. The precedence value determines the order in which the PC5 QoS Rules are evaluated. The PC5 QoS Rule with lower precedence value is evaluated before those with the higher precedence values.

The V2X layer provides information for PC5 QoS operations per destination (e.g. identified by Destination Layer-2 ID) to AS layer for Per-flow QoS model operations as below:

1) To add a new PC5 QoS Flow or to modify any existing PC5 QoS Flow, the V2X layer provides the following information for the PC5 QoS Flow to AS layer.
   - the PFI;
   - the corresponding PC5 QoS parameters; and
   - source/destination Layer-2 IDs for broadcast and groupcast, or the PC5 Link Identifier for unicast.
2) To remove any existing PC5 QoS Flow, the V2X layer provides the following information for the PC5 QoS Flow to AS layer.
   - the PFI; and
   - source/destination Layer-2 IDs for broadcast and groupcast, or the PC5 Link Identifier for unicast.

In addition, the V2X layer also provides the communication mode (e.g. broadcast, groupcast, unicast), radio frequencies, Tx Profile to the AS layer for the PC5 operation. The radio frequencies and Tx Profile are determined based on the V2X service type. The V2X layer ensures that V2X service types (e.g. identified by PSIDs or ITS-AIDS) associated with different radio frequencies are classified into distinct PC5 QoS Flows.

Figure 5.4.1.1.3-1 illustrated an example of the classification and marking of user plane traffic using the PC5 QoS Rules, and the mapping of PC5 QoS Flows to radio resources at access stratum layer.

Figure 8:
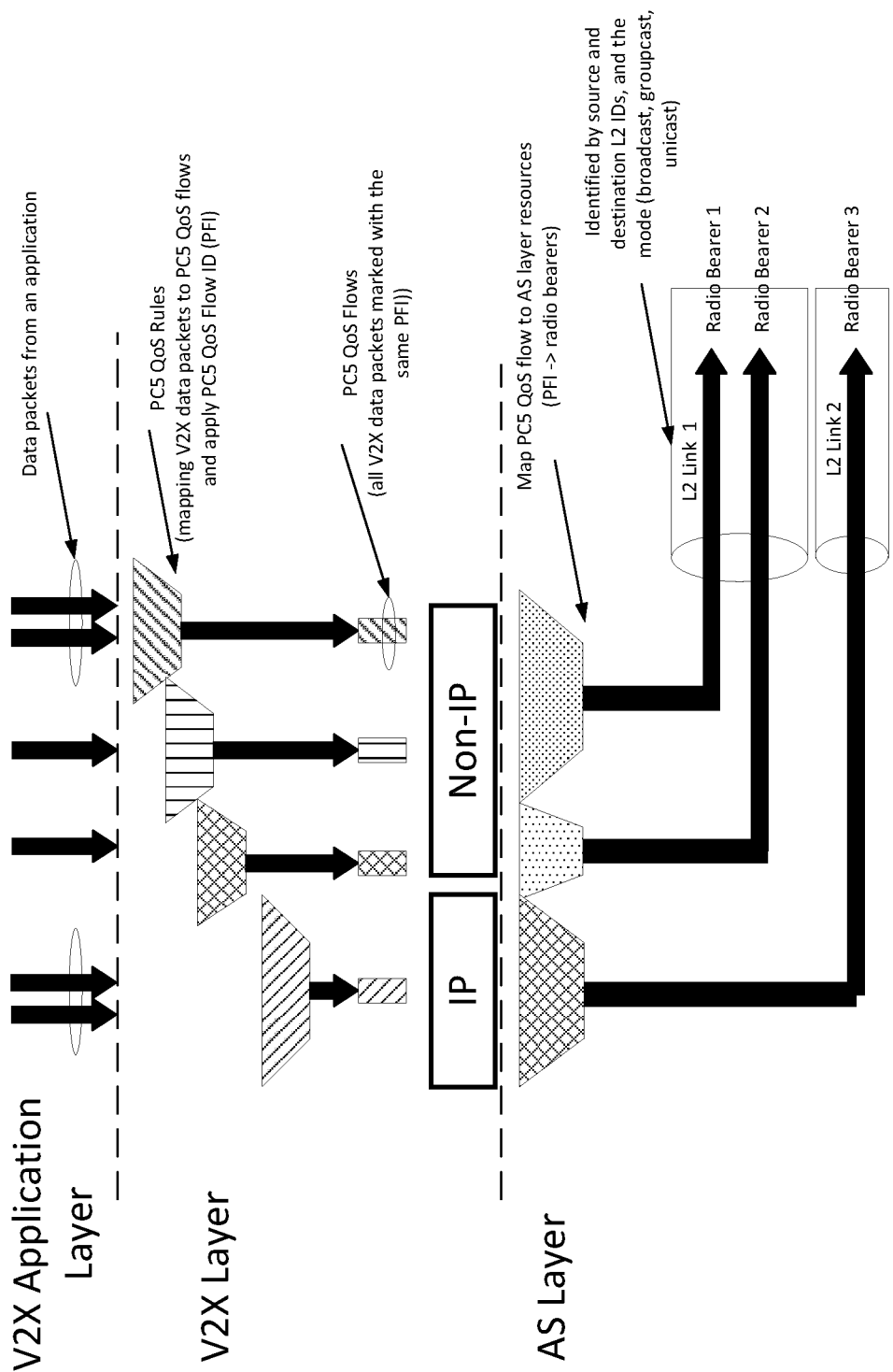
FIG. 8 is a reproduction of Figure 5.4.1.1.3-1 of 3GPP TS 23.287 V16.2.0.

[Figure 5.4.1.1.3-1 of 3GPP TS 23.287 V16.2.0, entitled "Handling of PC5 QoS Flows based on PC5 QoS Rules", is reproduced as FIG. 8]

As illustrated in Figure 5.4.1.1.3-1, for a given pair of source and destination Layer-2 IDs, there can be multiple radio bearers, each corresponding to a different PC5 QoS level. The AS layer can determine the mapping of multiple PC5 QoS Flows to the same radio bearer based on the information provided. For broadcast and groupcast, the L2 link goes to all UEs in proximity identified by the destination Layer-2 ID.

5.4.1.1.4 PC5 Packet Filter Set

PC5 Packet Filter Set supports two types of packet filters, i.e. the IP Packet Filter Set and the V2X Packet Filter Set. A PC5 QoS Rule contains either the IP Packet Filter Set or the V2X Packet Filter Set.

The IP Packet Filter Set is defined in TS 23.501 [6] clause 5.7.6.2.

The V2X Packet Filter Set shall support Packet Filters based on at least any combination of:

- V2X Service type (e.g. PSID or ITS-AID);
- Source/Destination Layer-2 ID;
- Application Layer ID (e.g. Station ID);
- Extension parameters.
    - Editor's note: Stage 3 can determine the Extension parameters to support, for example, input parameters from upper layer protocols or extension header fields (e.g. the TC field of GeoNetworking Common header, WAVE Information Element Extension, etc.).

[ . . . . ]

6.3.3.1 Layer-2 Link Establishment Over PC5 Reference Point

To perform unicast mode of V2X communication over PC5 reference point, the UE is configured with the related information as described in clause 5.1.2.1.

Figure 6.3.3.1-1 shows the layer-2 link establishment procedure for unicast mode of V2X communication over PC5 reference point.

Figure 9:
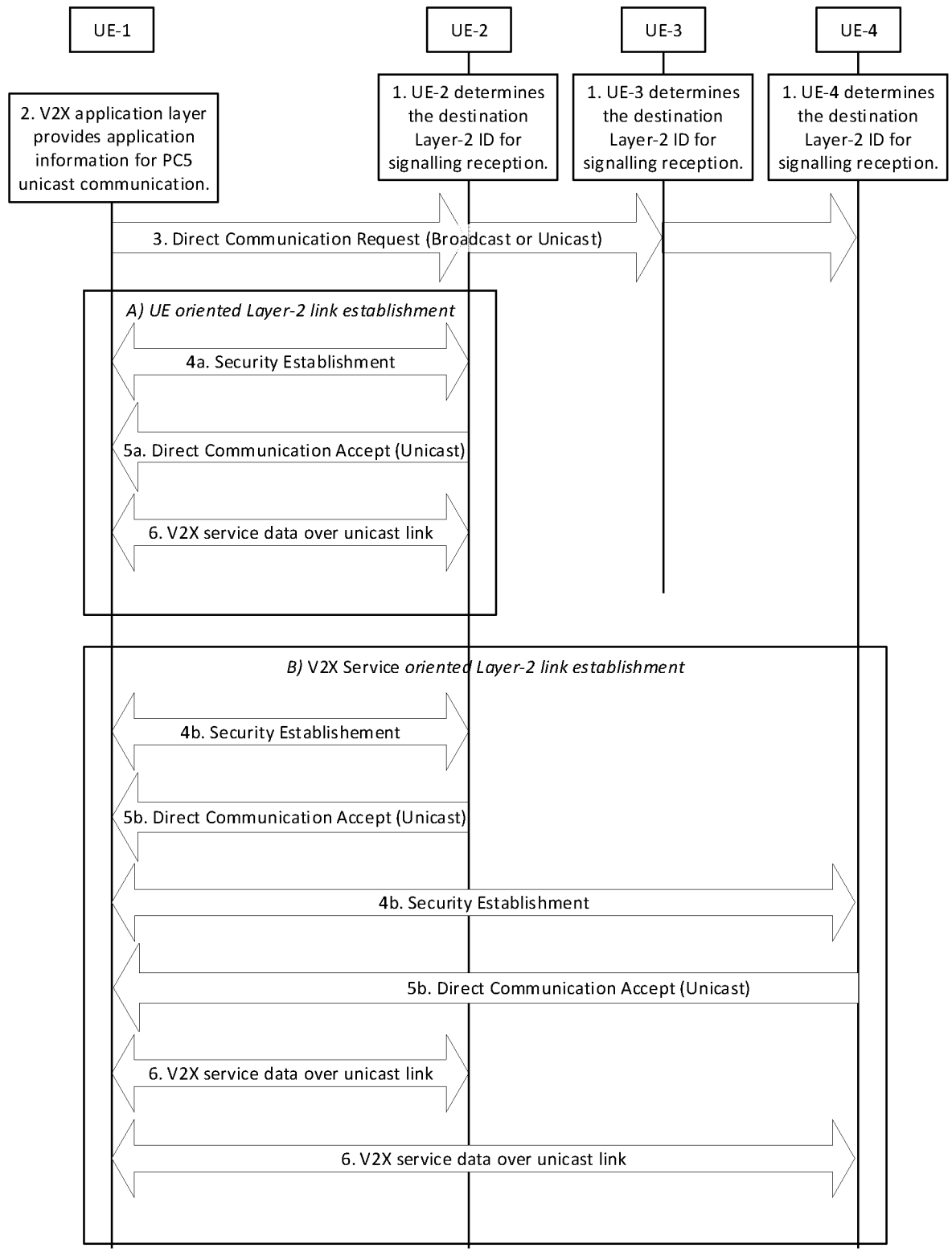
FIG. 9 is a reproduction of Figure 6.3.3.1-1 of 3GPP TS 23.287 V16.2.0.

[Figure 6.3.3.1-1 of 3GPP TS 23.287 V16.2.0, entitled "Layer-2 link establishment procedure", is reproduced as FIG. 9]

1. The UE(s) determine the destination Layer-2 ID for signalling reception for PC5 unicast link establishment as specified in clause 5.6.1.4. The destination Layer-2 ID is configured with the UE(s) as specified in clause 5.1.2.1.
2. The V2X application layer in UE-1 provides application information for PC5 unicast communication. The application information includes the V2X service type(s) (e.g. PSID(s) or ITS-AID(s)) of the V2X application and the initiating UE's Application Layer ID. The target UE's Application Layer ID may be included in the application information.
    The V2X application layer in UE-1 may provide V2X Application Requirements for this unicast communication. UE-1 determines the PC5 QoS parameters and PFI as specified in clause 5.4.1.4.
    If UE-1 decides to reuse the existing PC5 unicast link as specified in clause 5.2.1.4, the UE triggers Layer-2 link modification procedure as specified in clause 6.3.3.4.
3. UE-1 sends a Direct Communication Request message to initiate the unicast layer-2 link establishment procedure. The Direct Communication Request message includes:
    Source User Info: the initiating UE's Application Layer ID (i.e. UE-Vs Application Layer ID).
    If the V2X application layer provided the target UE's Application Layer ID in step 2, the following information is included:
        Target User Info: the target UE's Application Layer ID (i.e. UE-2's Application Layer ID).
    V2X Service Info: the information about V2X Service(s) requesting Layer-2 link establishment (e.g. PSID(s) or ITS-AID(s)).
    Security Information: the information for the establishment of security.
    NOTE 1: The Security Information and the necessary protection of the Source User Info and Target User Info are defined by SA WG3.
        The source Layer-2 ID and destination Layer-2 ID used to send the Direct Communication Request message are determined as specified in clauses 5.6.1.1 and 5.6.1.4. The destination Layer-2 ID may be broadcast or unicast Layer-2 ID. When unicast Layer-2 ID is used, the Target User Info shall be included in the Direct Communication Request message.
        UE-1 sends the Direct Communication Request message via PC5 broadcast or unicast using the source Layer-2 ID and the destination Layer-2 ID.
4. Security with UE-1 is established as below:
    4a. If the Target User Info is included in the Direct Communication Request message, the target UE, i.e. UE-2, responds by establishing the security with UE-1.
    4b. If the Target User Info is not included in the Direct Communication Request message, the UEs that are interested in using the announced V2X Service(s) over a PC5 unicast link with UE-1 responds by establishing the security with UE-1.
    NOTE 2: The signalling for the Security Procedure is defined by SA WG3.
        When the security protection is enabled, UE-1 sends the following information to the target UE:
        If IP communication is used:
            IP Address Configuration: For IP communication, IP address configuration is required for this link and indicates one of the following values:
            "IPv6 Router" if IPv6 address allocation mechanism is supported by the initiating UE, i.e., acting as an IPv6 Router; or
            "IPv6 address allocation not supported" if IPv6 address allocation mechanism is not supported by the initiating UE.
            Link Local IPv6 Address: a link-local IPv6 address formed locally based on RFC 4862 [21] if UE-1 does not support the IPv6 IP address allocation mechanism, i.e. the IP Address Configuration indicates "IPv6 address allocation not supported".
            QoS Info: the information about PC5 QoS Flow(s). For each PC5 QoS Flow, the PFI and the corresponding PC5 QoS parameters (i.e. PQI and conditionally other parameters such as MFBR/GFBR, etc.).
        The source Layer-2 ID used for the security establishment procedure is determined as specified in clauses 5.6.1.1 and 5.6.1.4. The destination Layer-2 ID is set to the source Layer-2 ID of the received Direct Communication Request message.

Upon receiving the security establishment procedure messages, UE-1 obtains the peer UE's Layer-2 ID for future communication, for signalling and data traffic for this unicast link.

5. A Direct Communication Accept message is sent to UE-1 by the target UE(s) that has successfully established security with UE-1:

5a. (UE oriented Layer-2 link establishment) If the Target User Info is included in the Direct Communication Request message, the target UE, i.e. UE-2 responds with a Direct Communication Accept message if the Application Layer ID for UE-2 matches.

5b. (V2X Service oriented Layer-2 link establishment) If the Target User Info is not included in the Direct Communication Request message, the UEs that are interested in using the announced V2X Service(s) respond to the request by sending a Direct Communication Accept message (UE-2 and UE-4 in Figure 6.3.3.1-1).

The Direct Communication Accept message includes:

Source User Info: Application Layer ID of the UE sending the Direct Communication Accept message.

QoS Info: the information about PC5 QoS Flow(s). For each PC5 QoS Flow, the PFI and the corresponding PC5 QoS parameters requested by UE-1 (i.e. PQI and conditionally other parameters such as MFBR/GFBR, etc).

If IP communication is used:

IP Address Configuration: For IP communication, IP address configuration is required for this link and indicates one of the following values: "IPv6 Router" if IPv6 address allocation mechanism is supported by the target UE, i.e., acting as an IPv6 Router; or "IPv6 address allocation not supported" if IPv6 address allocation mechanism is not supported by the target UE.

Link Local IPv6 Address: a link-local IPv6 address formed locally based on RFC 4862 [21] if the target UE does not support the IPv6 IP address allocation mechanism, i.e. the IP Address Configuration indicates "IPv6 address allocation not supported", and UE-1 included a link-local IPv6 address in the Direct Communication Request message. The target UE shall include a non-conflicting link-local IPv6 address.

If both UEs (i.e. the initiating UE and the target UE) selected to use link-local IPv6 address, they shall disable the duplicate address detection defined in RFC 4862 [21].

NOTE 3: When either the initiating UE or the target UE indicates the support of IPv6 router, corresponding address configuration procedure would be carried out after the establishment of the layer 2 link, and the link-local IPv6 addresses are ignored.

The V2X layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.

6. V2X service data is transmitted over the established unicast link as below:

The PC5 Link Identifier, and PFI are provided to the AS layer, together with the V2X service data.

Optionally in addition, the Layer-2 ID information (i.e. source Layer-2 ID and destination Layer-2 ID) is provided to the AS layer.

NOTE 4: It is up to UE implementation to provide the Layer-2 ID information to the AS layer.

UE-1 sends the V2X service data using the source Layer-2 ID (i.e. UE-1's Layer-2 ID for this unicast link) and the destination Layer-2 ID (i.e. the peer UE's Layer-2 ID for this unicast link).

NOTE 5: PC5 unicast link is bi-directional, therefore the peer UE of UE-1 can send the V2X service data to UE-1 over the unicast link with UE-1.

[ . . . .]

6.3.3.4 Layer-2 Link Modification for a Unicast Link

Figure 6.3.3.4-1 shows the layer-2 link modification procedure for a unicast link. This procedure is used to:

add new V2X service(s) to the existing PC5 unicast link.

remove V2X service(s) from the existing PC5 unicast link.

add new PC5 QoS Flow(s) in the existing PC5 unicast link.

modify existing PC5 QoS Flow(s) in the existing PC5 unicast link.

remove existing PC5 QoS Flow(s) in the existing PC5 unicast link.

Figure 10:
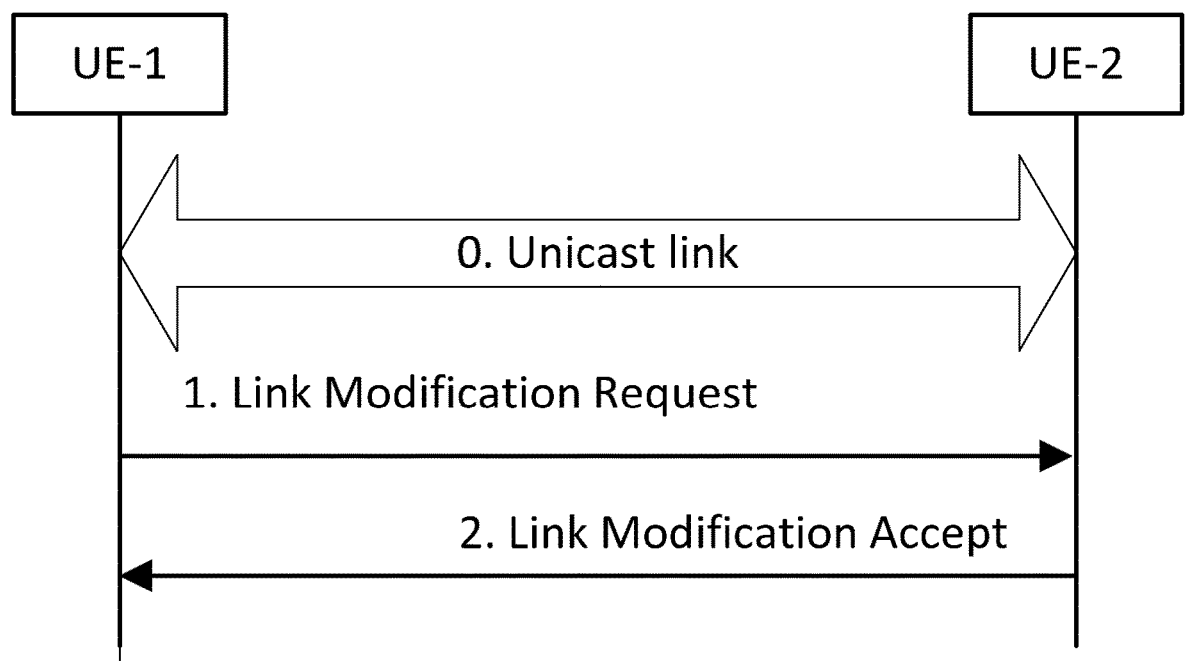
FIG. 10 is a reproduction of Figure 6.3.3.4-1 of 3GPP TS 23.287 V16.2.0.

[Figure 6.3.3.4-1 of 3GPP TS 23.287 V16.2.0, entitled "Layer-2 link modification procedure", is reproduced as FIG. 10]

0. UE-1 and UE-2 have a unicast link established as described in clause 6.3.3.1.

1. The V2X application layer in UE-1 provides application information for PC5 unicast communication. The application information includes the V2X service type(s) (e.g. PSID(s) or ITS-AID(s)) of the V2X application(s) and the initiating UE's Application Layer ID. The target UE's Application Layer ID may be included in the application information. If UE-1 decides to reuse the existing PC5 unicast link as specified in clause 5.2.1.4, so decides to modify the unicast link established with UE-2, UE-1 sends a Link Modification Request to UE-2.

The Link Modification Request message includes:

a) To add new V2X service(s) to the existing PC5 unicast link:

V2X Service Info: the information about V2X Service(s) to be added (e.g. PSID(s) or ITS-AID(s)).

QoS Info: the information about PC5 QoS Flow(s) for each V2X Service to be added. For each PC5 QoS Flow, the PFI and the corresponding PC5 QoS parameters (i.e. PQI and conditionally other parameters such as MFBR/GFBR, etc).

b) To remove a V2X service(s) from the the existing PC5 unicast link:

V2X Service Info: the information about V2X Service(s) to be removed (e.g. PSID(s) or ITS-AID(s)).

c) To add new PC5 QoS Flow(s) in the existing PC5 unicast link:
V2X Service Info: the information about V2X Service(s) that needs to add new QoS Flows (e.g. PSID(s) or ITS-AID(s)).
QoS Info: the information about PC5 QoS Flow(s) to be modified. For each PC5 QoS Flow, the PFI and the corresponding PC5 QoS parameters (i.e. PQI and conditionally other parameters such as MFBR/GFBR, etc).
d) To modify PC5 QoS Flow(s) in the existing PC5 unicast link:
QoS Info: the information about PC5 QoS Flow(s) to be modified. For each PC5 QoS Flow, the PFI and the corresponding PC5 QoS parameters (i.e. PQI and conditionally other parameters such as MFBR/GFBR, etc.).
e) To remove PC5 QoS Flow(s) in the existing PC5 unicast link:
PFIs.
2. UE-2 responds with a Link Modification Accept message.
The Link Modification Accept message includes:
For case a), case c) and case d) described in step 1:
QoS Info: the information about PC5 QoS Flow(s). For each PC5 QoS Flow, the PFI and the corresponding PC5 QoS parameters (i.e. PQI and conditionally other parameters such as MFBR/GFBR, etc).
The V2X layer of each UE provides information about the unicast link modification to the AS layer. This enables the AS layer to update the context related to the modified unicast link.

3GPP TS 23.502 specifies UE requested PDU Session Establishment and PDU Session Modification for a UE to access the service provided by a data network (DN) as follows:

4.3.2.2 UE Requested PDU Session Establishment
4.3.2.2.1 Non-Roaming and Roaming with Local Breakout
Clause 4.3.2.2.1 specifies PDU Session establishment in the non-roaming and roaming with local breakout cases. The procedure is used to:
Establish a new PDU Session;
Handover a PDN Connection in EPS to PDU Session in 5GS without N26 interface;
Switching an existing PDU Session between non-3GPP access and 3GPP access. The specific system behaviour in this case is further defined in clause 4.9.2; or
Request a PDU Session for Emergency services.

In the case of roaming, the AMF determines if a PDU Session is to be established in LBO or Home Routing. In the case of LBO, the procedure is as in the case of non-roaming with the difference that the AMF, the SMF, the UPF and the PCF are located in the visited network. PDU Sessions for Emergency services are never established in Home Routed mode. If Control Plane CIoT 5GS Optimisation is enabled for the PDU session with LBO, the NEF is not used as the anchor of this PDU Session.

Figure 11:
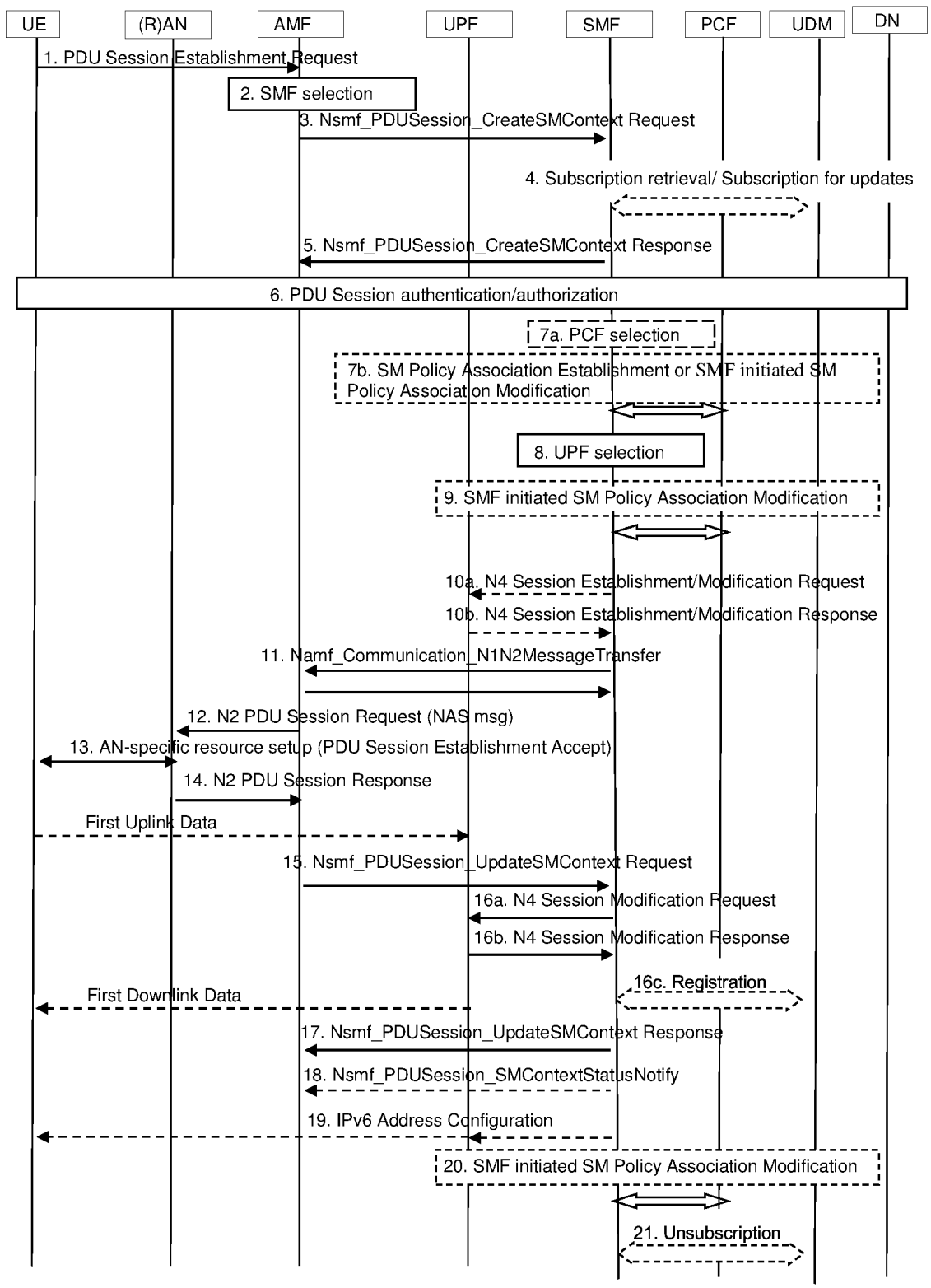
FIG. 11 is a reproduction of Figure 4.3.2.2.1-1 of 3GPP TS 23.502 V16.5.1.

NOTE 1: UE provides both the S-NSSAIs of the Home PLMN and Visited PLMN to the network as described in clause 5.15.5.3 of TS 23.501 [2].
[Figure 4.3.2.2.1-1 of 3GPP TS 23.502 V16.5.1, entitled "UE-requested PDU Session Establishment for non-roaming and roaming with local breakout", is reproduced as FIG. 11]

4.3.3 PDU Session Modification
4.3.3.1 General
The procedure is used when one or several of the QoS parameters exchanged between the UE and the network are modified.
NOTE: The conditions when to use this procedure for QoS change as well as the QoS parameters exchanged between the UE and the network are defined in TS 23.501 [2] clause 5.7.

Figure 12:
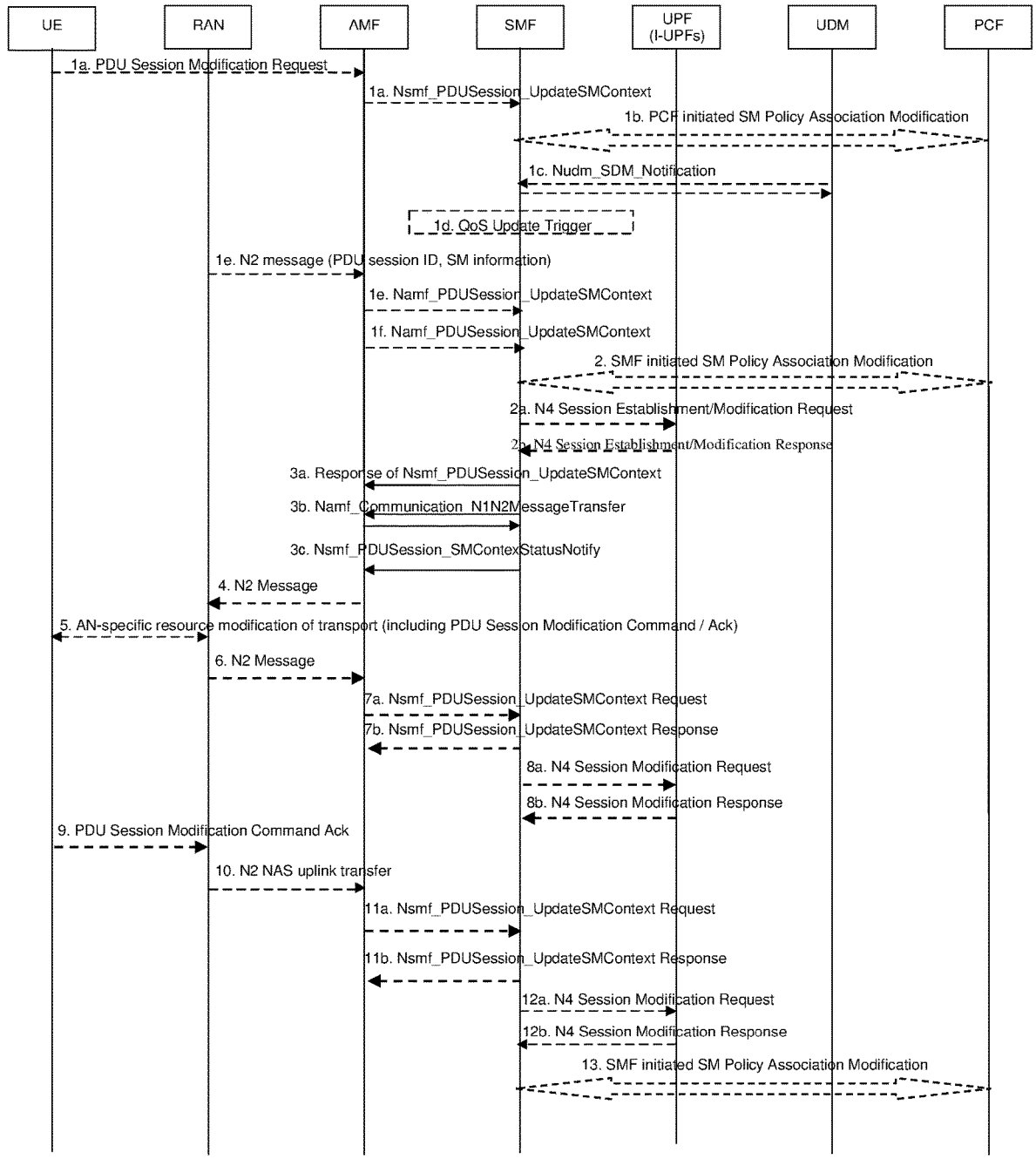
FIG. 12 is a reproduction of Figure 4.3.3.2-1 of 3GPP TS 23.502 V16.5.1.

4.3.3.2 UE or Network Requested PDU Session Modification (Non-Roaming and Roaming with Local Breakout)
The UE or network requested PDU Session Modification procedure (non-roaming and roaming with local breakout scenario) is depicted in figure 4.3.3.2-1.
[Figure 4.3.3.2-1 of 3GPP TS 23.502 V16.5.1, entitled "UE or network requested PDU Session Modification (for non-roaming and roaming with local breakout)", is reproduced as FIG. 12]
[ . . . .]

3GPP TS 24.501 specifies Quality of Service (QoS) and defines PDU session modification request message as follows:

6.2.5 Quality of Service
6.2.5.1 General
6.2.5.1.1 QoS Rules
6.2.5.1.1.1 General
In a PDU session of IPv4, IPv6, IPv4v6 and Ethernet PDU session type, the NAS protocol enables different forwarding treatments of UL user data packets in one or more QoS flows based on signalled QoS rules, derived QoS rules or any combination of them.
In a PDU session of Unstructured PDU session type, all UL user data packets are associated with the same QoS flow.

6.2.5.1.1.2 Signalled QoS Rules
The NAS protocol enables the network to provide the UE with signalled QoS rules associated with a PDU session.
The network can provide the UE with one or more signalled QoS rules associated with a PDU session at the PDU session establishment or at the PDU session modification.
Each signalled QoS rule contains:
a) an indication of whether the QoS rule is the default QoS rule;
b) a QoS rule identifier (QRI);
c) a QoS flow identifier (QFI);
d) optionally, a set of packet filters; and
e) a precedence value.
NOTE 1: The default QoS rule indication (DQR) of a signalled QoS rule cannot be changed.
For case d) above:
1) If the QoS rule is the default rule of a PDU session of IPv4, IPv6, IPv4v6 or Ethernet PDU session type, the set of packet filters contains zero or more packet filters for DL direction, and may additionally contain one of the following:
A) a match-all packet filter for UL direction;
B) a match-all packet filter for UL and DL directions;
C) zero or more packet filters for UL direction (other than the match-all packet filter for UL direction);
D) zero or more packet filters for UL and DL directions (other than the match-all packet filter for UL and DL directions); or
E) one or more packet filters for UL direction (other than the match-all packet filter for UL direction) and one or more packet filters for UL and DL directions (other than the match-all packet filter for UL and DL directions).

The set of packet filters for the default rule shall not be empty. If the default QoS rule contains a match-all packet filter, then the highest precedence value shall be used for the default QoS rule.

2) If the QoS rule is a QoS rule of a PDU session of IPv4, IPv6, IPv4v6 or Ethernet PDU session type and is not the default QoS rule, the set of packet filters contains zero or more packet filters for the DL direction, and may additionally contain one of the following:

A) zero or more packet filters for UL direction (other than the match-all packet filter for UL direction); and B) zero or more packet filters for both UL and DL directions (other than the match-all packet filter for UL and DL directions).

The set of packet filters for a QoS rule which is not the default QoS rule shall not be empty.

3) For PDU session of unstructured PDU session type, there is only one QoS rule associated with it and the set of packet filters of that QoS rule is empty.

If the UE requests a new QoS rule, it shall assign a precedence value for the signalled QoS rule which is not in the range from 70 to 99 (decimal).

NOTE 2: In this release of the specification, there is no support for a match-all packet filter for DL direction.

NOTE 3: In order to support QoS differentiation in case of access to PLMN services via an SNPN, the UE, within the SNPN, can construct packet filters based on the destination IP address to reach the N3IWF in the PLMN and the security parameters index (SPI) for the IPsec SA.

NOTE 4: In order to support QoS differentiation in case of access to SNPN services via a PLMN, the UE, within the PLMN, can construct packet filters based on the destination IP address to reach the N3IWF in the SNPN and the security parameters index (SPI) for the IPsec SA.

NOTE 5: The above described condition of assigning a precedence value for the signalled QoS rule is applied to the UE when the UE requests a QoS rule for network to bind service data flows described by the QoS rule to a dedicated QoS flow by setting the segregation bit to 1.

In NB-N1 mode, there is only one QoS rule associated with a PDU session and that is the default QoS rule. As described in 3GPP TS 23.501 [8], when the SMF determines that the UE has:

a) moved from a tracking area in WB-N1 mode into a tracking area in NB-N1 mode;

b) moved from a tracking area in WB-S1 mode into a tracking area in NB-N1 mode; or c) moved from a tracking area in NR connected to 5GCN into a tracking area in NB-N1 mode;

the SMF shall, for each PDU session that is kept active, initiate the PDU session modification procedure (see subclause 6.3.3.2) to delete every QoS rule that is not the default QoS rule, if any.

Within a PDU session:

a) each signalled QoS rule has a unique QRI;

b) there is at least one signalled QoS rule;

c) one signalled QoS rule is the default QoS rule; and d) there can be zero, one or more signalled QoS rules associated with a given QFI.

6.2.5.1.1.3 Derived QoS Rules

Derived QoS rules are applicable only for PDU session of IPv4, IPv6, IPv4v6 or Ethernet PDU session type.

The reflective QoS in the UE creates derived QoS rules associated with a PDU session based on DL user data packets received via the PDU session.

Each derived QoS rule contains:

a) a QoS flow identifier (QFI);

b) a packet filter for UL direction; and c) a precedence value of 80 (decimal).

NOTE: On the network side, the corresponding QoS rule can be associated with a different precedence value in the range from 70 to 99 (decimal).

Within a PDU session:

a) there can be zero, one or more derived QoS rules associated with a given QFI; and b) there can be up to one derived QoS rule associated with a given packet filter for UL direction.

In the UE, a timer T3583 runs for each derived QoS rule. Reflective QoS is not supported in NB-N1 mode.

6.2.5.1.1.4 QoS Flow Descriptions

The network can also provide the UE with one or more QoS flow descriptions associated with a PDU session at the PDU session establishment or at the PDU session modification.

Each QoS flow description contains:

a) a QoS flow identifier (QFI);

b) if the flow is a GBR QoS flow:

1) Guaranteed flow bit rate (GFBR) for UL;
   2) Guaranteed flow bit rate (GFBR) for DL;
   3) Maximum flow bit rate (MFBR) for UL;
   4) Maximum flow bit rate (MFBR) for DL; and
   5) optionally averaging window, applicable for both UL and DL;

c) 5QI, if the QFI is not the same as the 5QI of the QoS flow identified by the QFI; and d) optionally, an EPS bearer identity (EBI) if the QoS flow can be mapped to an EPS bearer as specified in subclause 4.11.2 of 3GPP TS 23.502 [9].

If the averaging window is not included in a QoS flow description for a GBR QoS flow with a 5QI indicated in 3GPP TS 23.501 [8] table 5.7.4-1, the averaging window associated with the 5QI in 3GPP TS 23.501 [8] table 5.7.4-1 applies for the averaging window.

If the averaging window is not included in a QoS flow description for a GBR QoS flow with a 5QI not indicated in 3GPP TS 23.501 [8] table 5.7.4-1, the standardized value of two seconds is used as the averaging window.

6.2.5.1.2 Session-AMBR

The NAS protocol enables the network to provide the UE with the session-AMBR associated with a PDU session.

The standardized value of two seconds is used as the averaging window for the UE's enforcement of the UL rate limitation indicated by the session-AMBR.

6.2.5.1.2A Void 6.2.5.1.3 UL User Data Packet Matching

For PDU session of IPv4, IPv6, IPv4v6 or Ethernet PDU session type, upon receiving an UL user data packet from the upper layers for transmission via a PDU session, the UE shall attempt to associate the UL user data packet with:

a) the QFI of a signalled QoS rule associated with the PDU session which has a set of packet filters containing a packet filter for UL direction matching the UL user data packet or containing a packet filter for both UL and DL directions matching the UL user data packet; or b) the QFI of a derived QoS rule associated with the PDU session which has the packet filter for UL direction matching the UL user data packet;

by evaluating the QoS rules in increasing order of their precedence values until the UL user data packet is associated with a QFI or all QoS rules are evaluated.

For PDU session of unstructured PDU session type, upon receiving an UL user data packet from the upper layers for transmission via a PDU session, the UE shall associate the UL user data packet with the QFI of the default QoS rule associated with the PDU session.

If the UL user data packet is associated with a QFI, the UE shall pass the QFI along the UL user data packet to the lower layers for transmission.

NOTE: Marking of the UL user data packet with the QFI is performed by the lower layers.

If all QoS rules are evaluated and the UL user data packet is not associated with a QFI, the UE shall discard the UL user data packet.

[ . . . .]

8.3.7 PDU Session Modification Request
8.3.7.1 Message Definition
The PDU SESSION MODIFICATION REQUEST message is sent by the UE to the SMF to request a modification of a PDU session. See table 8.3.7.1.1.
Message type: PDU SESSION MODIFICATION REQUEST
Significance: dual
Direction: UE to network
[Table 8.3.7.1.1 of 3GPP TS 24.501 V16.5.1, entitled "PDU SESSION MODIFICATION REQUEST message content", is reproduced as FIG. 13]
NOTE: It is possible for UEs compliant with earlier versions of this specification to send the Mapped EPS bearer contexts IE with IEI of value "7F" for this message.
[ . . . .]

8.3.7.7 Requested QoS Rules
This IE is included in the message when the UE requests a specific QoS handling.

8.3.7.8 Requested QoS Flow Descriptions
This IE is included in the message when the UE requests a specific QoS flow descriptions.

[ . . . .]

3GPP TS 23.501 specifies packet filter set as follows:
5.7.6 Packet Filter Set
5.7.6.1 General
The Packet Filter Set is used in the QoS rule and the PDR to identify one or more packet (IP or Ethernet) flow(s).
NOTE 1: A QoS Flow is characterised by PDR(s) and QoS rule(s) as described in clause 5.7.1.1.
NOTE 2: DL Packet Filter in a Packet Filter Set of a QoS rule may be needed by the UE e.g. for the purpose of IMS precondition.
The Packet Filter Set may contain one or more Packet Filter(s). Every Packet Filter is applicable for the DL direction, the UL direction or both directions.
NOTE 3: The Packet Filter in the Packet Filter Set of the default QoS rule that allows all UL traffic (also known as match-all Packet Filter) is described in TS 24.501 [47].
There are two types of Packet Filter Set, i.e. IP Packet Filter Set, and Ethernet Packet Filter Set, corresponding to those PDU Session Types.

5.7.6.2 IP Packet Filter Set
For IP PDU Session Type, the Packet Filter Set shall support Packet Filters based on at least any combination of:
Source/destination IP address or IPv6 prefix.
Source/destination port number.
Protocol ID of the protocol above IP/Next header type.
Type of Service (TOS) (IPv4)/Traffic class (IPv6) and Mask.
Flow Label (IPv6).
Security parameter index.
Packet Filter direction.
NOTE 1: A value left unspecified in a Packet Filter matches any value of the corresponding information in a packet.
NOTE 2: An IP address or Prefix may be combined with a prefix mask.
NOTE 3: Port numbers may be specified as port ranges.

[ . . . .]

In Release 16 (as discussed in 3GPP TS 23.303), both Model A discovery and Model B discovery are supported for discovering a UE-to-Network Relay. Model A uses a single discovery protocol message (i.e. Announcement), and Model B uses two discovery protocol messages (i.e. Solicitation and Response). These two discovery mechanisms may also be reused for the next release of UE-to-Network Relay discovery.

After a Remote UE discovers a UE-to-Network Relay (or a Relay UE), the Remote UE may then establish a unicast link with the Relay UE for transferring traffic of a concerned service with a concerned data network (DN) via the Relay UE. The Remote UE may transmit a Direct Communication Request message to establish the unicast link with the Relay UE.

According to 3GPP TS 23.287, the Direct Communication Request message may be transmitted using a known Layer-2 ID of the Relay UE or a default destination Layer-2 ID associated with the V2X service which the Remote UE is interested in. And, the default destination Layer-2 ID is configured for PC5 unicast link establishment. Besides, the Direct Communication Request message may include Service Info (e.g. Provider Service Identity/Identifier (PSID) or Intelligent Transport Systems Application Identifier (ITS-AID)) to indicate the connectivity service. In response, the Relay UE may reply with a Direct Communication Accept message to complete establishment of the unicast link. The Direct Communication Accept message may be addressed to a Layer-2 ID of the Remote UE.

For relaying the traffic between the Remote UE and the data network (DN), the Relay UE needs to establish a PDU session with the DN before or after a unicast link is established with the Remote UE. According to 3GPP TS 24.501, the NAS protocol enables the core network (CN) to provide a UE (i.e. a Relay UE in the scenario of UE-to-Network Relay) with signalled QoS rules associated with a PDU session. The network can provide the UE with one or more signalled QoS rules associated with a PDU session at the PDU session establishment or at the PDU session modification e.g. via a PDU Session Establishment Accept message or a PDU Session Modification Command message sent to the UE. Each signalled QoS rule may contain at least one of the following parameters:
a) an indication of whether the QoS rule is the default QoS rule;
b) a QoS rule identifier (QRI);
c) a QoS flow identifier (QFI);
d) optionally, a set of packet filters; and
e) a precedence value.

Thus, within a PDU session:
a) each signalled QoS rule has a unique QRI;
b) there is at least one signalled QoS rule;
c) one signalled QoS rule is the default QoS rule; and
d) there can be zero, one or more signalled QoS rules associated with a given QFI.

Besides, the core network can also provide the UE with one or more QoS flow descriptions associated with a PDU session at the PDU session establishment or at the PDU session modification. Each QoS flow description may contain at least one of the following parameters:
 a) a QoS flow identifier (QFI);
 b) if the flow is a GBR QoS flow:
  1) Guaranteed flow bit rate (GFBR) for UL;
  2) Guaranteed flow bit rate (GFBR) for DL;
  3) Maximum flow bit rate (MFBR) for UL;
  4) Maximum flow bit rate (MFBR) for DL; and
  5) optionally averaging window, applicable for both UL and DL;
 c) 5QI, if the QFI is not the same as the 5QI of the QoS flow identified by the QFI; and
 d) optionally, an EPS bearer identity (EBI) if the QoS flow can be mapped to an EPS bearer as specified in subclause 4.11.2 of 3GPP TS 23.502.

For PDU session of IPv4, IPv6, IPv4v6 or Ethernet PDU session type, upon receiving an UL user data packet from the upper layers for transmission via a PDU session, the UE shall attempt to associate the UL user data packet with the QFI of a QoS rule associated with the PDU session which has a set of packet filters for matching the UL user data packet by evaluating the QoS rules in increasing order of their precedence values until the UL user data packet is associated with a QFI or all QoS rules are evaluated.

For PDU session of unstructured PDU session type, upon receiving an UL user data packet from the upper layers for transmission via a PDU session, the UE shall associate the UL user data packet with the QFI of the default QoS rule associated with the PDU session.

If the UL user data packet is associated with a QFI, the UE shall pass the QFI along the UL user data packet to the lower layers for transmission. Otherwise, the UE shall discard the UL user data packet.

In NR sidelink (or V2X) as discussed in 3GPP TS 23.287, the UE shall derive PC5 QoS parameters and PC5 QoS Rules for PC5 QoS flows based on the V2X Application Requirements provided by the V2X application layer (if available) and the V2X service type (e.g. PSID or ITS-AID) and also assign a PC5 flow identity (PFI) for each PC5 QoS flow.

In the scenario of UE-to-NW relaying, the Remote UE's data flow is served by the Relay UE's PDU Session. Basically, the UE-to-Network relay path comprises of two legs (i.e. one PC5 leg and one Uu leg). If UE-derived QoS Rules are applied by the Remote UE for UL traffic on the PC5 leg and network-configured QoS Rules are applied by the Relay UE for UL traffic on the Uu leg respectively, there is a need for the Remote UE to provide those parameters used in a packet filter (e.g. Source/destination IP address, Source/destination port number, Protocol ID, Type of Service (TOS)/Traffic class, Flow Label, and Security parameter index, etc.) associated with each QoS flow to the Remote UE so that the Relay UE can map data packets received from the Remote UE to QoS flows according to the network-configured QoS Rules. This would cause a lot of signalling overhead.

A better solution would be for the Relay UE to provide the QoS Rules associated with a PDU session to the Remote UE so that the Remote UE can map data packets to QoS flows based on the QoS Rules and transmit the data packets attached with QoS flow IDs to the Relay UE. And, the Relay UE can just follow the QoS flow IDs generated by the Remote UE and maps the QoS flows received from the Remote UE to data radio bearers (DRBs) on the Uu leg, according to QoS flow-to-DRB mapping information provided by the network so as to transmit the data packets to the network via the mapped DRBs.

The Relay UE may transmit QoS rules associated with a PDU session to the Remote UE after the PDU session is established e.g. via a Direct Communication Accept message if the PDU session is established before this message or a Link Modification Request message if the PDU session is established after the PC5 unicast link has been established. It is also feasible to use other (new) message. Preferably, QoS flow descriptions (e.g. QoS profiles) may also be transmitted by the Relay UE to the Remote UE in the concerned message.

Regarding QoS handling for UE-to-Network relaying, Solution #24 in 3GPP TR 23.752 describes the Remote UE's data flow is served by the Relay UE's PDU Session. As the UE-to-Network relay path comprises of two legs (PC5 and Uu) as shown in Figure 6.24.1-1 (reproduced as FIG. 5) of 3GPP TR 23.752, the end-to-end QoS can be met only when the QoS requirements are properly split and satisfied over the two legs respectively. This is especially true for the QoS parameter of Packet Delay Budget (PDB). For example, the end-to-end PDB may be split into a PDB over the Uu leg and a PDB over the PC5 leg (e.g. end-to-end PDB=PDB over Uu leg+PDB over PC5 leg).

3GPP TS 23.502 specifies a PDU session establishment procedure to establish a PDU session. The network may provide authorized QoS rules and authorized QoS flow descriptions associated with the PDU session to a UE (e.g. the Relay UE in the scenario of UE-to-NW relaying) in a PDU Session Establishment Accept message. After the PDU session has been established, the UE may request modification of a PDU session. For example, the UE may include requested QoS rules and/or requested QoS flow descriptions associated with the PDU session in a PDU Session Modification Request message sent to the network.

In the scenario of UE-to-NW relaying, suppose it is the Remote UE which may determine whether the current QoS is satisfactory. Thus, for the Relay UE to initiate a PDU session modification procedure for the PDU session, there is a need for the Remote UE to transmit the requested QoS rules and/or the requested QoS flow descriptions to the Relay UE (e.g. in a Link Modification Request message).

In one embodiment, the requested QoS rules indicate at least one QoS rule to be used for the PDU session. Each QoS rule may contain at least one of the following parameters: a QoS rule identifier (QRI), a QoS flow identifier (QFI), a set of packet filters, and a precedence value. And, each packet filter may be formed by at least any combination of: Source/destination IP address or IPv6 prefix, Source/destination port number, Protocol ID of the protocol above IP/Next header type, Type of Service (TOS) (IPv4)/Traffic class (IPv6) and Mask, Flow Label (IPv6), Security parameter index, and Packet Filter direction. The requested QoS flow descriptions indicate at least one QoS flow description to be used for the PDU session. Each QoS flow description may contain at least one of the following parameters: a QoS flow identifier (QFI), a QoS identifier (e.g. 5QI), Guaranteed flow bit rate (GFBR), Maximum flow bit rate (MFBR), and an EPS bearer identity (EBI).

Since the PDU session modification procedure is mainly used to modify the PDU session over the Uu leg, one potential solution is for the Remote UE to transmit a QoS identifier (e.g. 5QI) associated with the Uu leg so that the Relay UE can provide the same QoS identifier (e.g. 5QI) to the network. Alternatively, the Remote UE may transmit a QoS identifier (e.g. 5QI) for end-to-end (i.e. covering both the Uu leg and the PC5 leg) to the Relay UE. The Relay UE may then derive a QoS identifier associated with the Uu leg from the QoS identifier for end-to-end and deliver the QoS identifier associated with the Uu leg to the network. The QoS identifier associated with the Uu leg may be derived from the QoS identifier for end-to-end according to a partition ratio, which may be a fixed value, a default value specified in the standards, a configured value included in system information received from the network, or a configured value included in a dedicated signaling received from the network. It is also feasible that the Relay UE may just forward the QoS identifier for end-to-end to the network and the network may then determine or derive the QoS identifier associated with the Uu leg by itself. Regarding QoS parameters, other than the QoS identifier, in a QoS flow description, the Relay UE may just forward them to the network.

In one embodiment, the Relay UE may transmit a PDU Session Modification Request message to the network in response to reception of the requested QoS rules and/or the requested QoS flow descriptions from the Remote UE. The PDU Session Modification Request message may include the requested QoS rules and the QoS flow descriptions (e.g. indicating end-to-end QoS requirements) derived from the requested QoS flow descriptions (e.g. indicating QoS requirements over a Uu leg). The network may then provide authorized QoS rules and authorized QoS flow descriptions associated with the PDU session to the Relay UE in a PDU Session Modification Command message.

Figure 14:
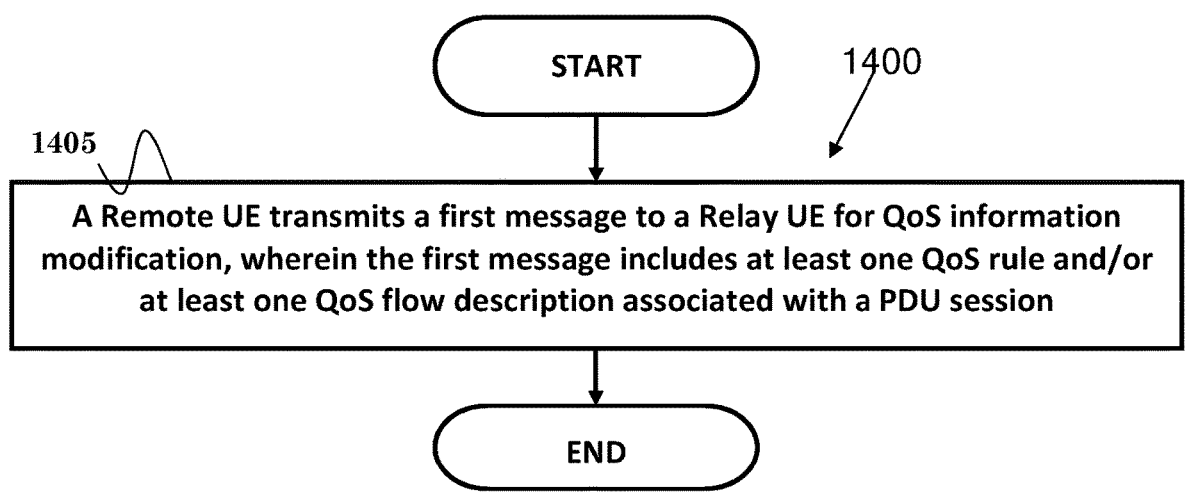
FIG. 14 is a flow chart according to one exemplary embodiment.

FIG. 14 is a flow chart 1400 according to one exemplary embodiment from the perspective of a Remote UE for modifying QoS information. In step 1405, a Remote UE transmits a first message to a Relay UE for QoS information modification, wherein the first message includes at least one QoS rule and/or at least one QoS flow description associated with a Protocol Data Unit (PDU) session. In one embodiment, the Remote UE could receive a second message from the Relay UE to complete the QoS information modification.

In one embodiment, the first message may include an identity of the PDU session or a relay service code (RSC) associated with the PDU session. The second message may include the identity of the PDU session or a relay service code (RSC) associated with the PDU session. The RSC may be transmitted by the Relay UE in a UE-to-Network Relay discovery message so that the Remote UE can discover the Relay UE which could provide the relay service for the PDU session to the Remote UE.

In one embodiment, each QoS rule may contain at least one of the following parameters: a QoS rule identifier (QRI), a QoS flow identifier (QFI), a set of packet filters, and a precedence value. Furthermore, each QoS flow description may contain at least one of the following parameters: a QoS flow identifier (QFI), a QoS identifier, Guaranteed flow bit rate (GFBR), Maximum flow bit rate (MFBR), and an EPS bearer identity (EBI). The QoS identifier in each QoS flow description could indicate QoS requirement(s) over a Uu leg. The QoS identifier in each QoS flow description could indicate end-to-end QoS requirement(s).

In one embodiment, the PDU session could be established for the Remote UE to access a service from a data network via the Relay UE. The first message may be a Link Modification Request message. The second message may be a Link Modification Accept message.

In one embodiment, each packet filter could be formed by at least any combination of: source/destination IP address or IPv6 prefix, source/destination port number, Protocol ID of the protocol above IP/Next header type, Type of Service (TOS) (IPv4)/Traffic class (IPv6) and Mask, Flow Label (IPv6), security parameter index, and Packet Filter direction. The source IP address or IPv6 prefix may be the IP address or IPv6 prefix of the Remote UE, and the destination IP address or IPv6 prefix may be the IP address or IPv6 prefix of the Relay UE. Alternatively, the source IP address or IPv6 prefix may be the IP address or IPv6 prefix of the Remote UE, and the destination IP address or IPv6 prefix may be the IP address or IPv6 prefix of the data network.

Referring back to FIGS. 3 and 4, in one exemplary embodiment of a Remote UE for modifying QoS information. The Remote UE 300 includes a program code 312 stored in the memory 310. The CPU 308 could execute program code 312 to enable the Remote UE to transmit a first message to a Relay UE for QoS information modification, wherein the first message includes at least one QoS rule and/or at least one QoS flow description associated with a PDU session. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for modifying Quality of Service (QoS) information, comprising:
   a relay User Equipment (UE) establishes a Protocol Data Unit (PDU) session over a Uu leg with a network, wherein the PDU session is identified by a PDU session ID;
   the relay UE receives a Direct Communication Request message from a remote UE to establish a unicast link for a connectivity service associated with the PDU session after the PDU session has been established, wherein the Direct Communication Request message includes information indicating the connectivity service;
   the relay UE receives a Link Modification Request message from the remote UE for QoS information modification after the unicast link has been established, wherein the Link Modification Request message includes at least one QoS rule and at least one QoS flow description associated with the PDU session, and wherein each QoS rule of the at least one QoS rule includes a QoS rule identifier (QRI) and a set of packet filters; and
   the relay UE transmits a PDU Session Modification Request message to the network in response to reception of the Link Modification Request message from the remote UE, wherein the PDU Session Modification Request message includes the at least one QoS rule, the at least one QoS flow description, and the PDU session ID.

2. The method of claim 1, wherein each QoS rule further comprises at least one of a QoS flow identifier (QFI), or a precedence value.

3. The method of claim 1, wherein each of the at least one QoS flow description comprises at least one of a QoS flow identifier (QFI), a QoS identifier, Guaranteed flow bit rate (GFBR), Maximum flow bit rate (MFBR), or an EPS bearer identity (EBI).

4. The method of claim 3, wherein the QoS identifier in each QoS flow description indicates at least one of QoS requirement(s) over a Uu leg or end-to-end QoS requirement(s).

5. The method of claim 2, wherein each packet filter is formed by a combination of at least two of:
   a source IP address, a destination IP address, an 1Pv6 prefix, a source/destination port number, a Protocol ID of the protocol above IP/Next header type, Type of Service (TOS) (1Pv4)/Traffic class (1Pv6) and Mask, Flow Label (1Pv6), security parameter index, or Packet Filter direction.

6. The method of claim 5, wherein the source IP address or 1Pv6 prefix is the IP address or 1Pv6 prefix of the Remote UE, and the destination IP address or 1Pv6 prefix is the IP address or 1Pv6 prefix of the Relay UE.

7. The method of claim 5, wherein the source IP address or 1Pv6 prefix is the IP address or 1Pv6 prefix of the Remote UE, and the destination IP address or 1Pv6 prefix is the IP address or IPv6 prefix of the data network.

8. A relay User Equipment (UE), comprising:
   a processor; and
   a memory operatively coupled to the processor, wherein the processor is configured to execute a program code stored in the memory to:
   establish a Protocol Data Unit (PDU) session over a Uu leg with a network, wherein the PDU session is identified by a PDU session ID;

receive a Direct Communication Request message from a remote UE to establish a unicast link for a connectivity service associated with the PDU session after the PDU session has been established, wherein the Direct Communication Request message includes information indicating the connectivity service;

receive a Link Modification Request message from the remote UE for QoS information modification after the unicast link has been established, wherein the Link Modification Request message includes at least one QoS rule and at least one QoS flow description associated with the PDU session, and wherein each QoS rule of the at least one QoS rule includes a QoS rule identifier (QRI) and a set of packet filters; and transmit a PDU Session Modification Request message to the network in response to reception of the Link Modification Request message from the remote UE, wherein the PDU Session Modification Request message includes the at least one QoS rule, the at least one QoS flow description, and the PDU session ID.

9. The remote UE of claim 8, wherein each QoS rule further comprises at least one of a QoS flow identifier (QFI), or a precedence value.

10. The remote UE of claim 8, wherein each of the at least one QoS flow description comprises at least one of a QoS flow identifier (QFI), a QoS identifier, Guaranteed flow bit rate (GFBR), Maximum flow bit rate (MFBR), or an EPS bearer identity (EBI).

11. The remote UE of claim 10, wherein the QoS identifier in each QoS flow description indicates at least one of QoS requirement(s) over a Uu leg or end-to-end QoS requirement(s).

12. The remote UE of claim 9, wherein each packet filter is formed by a combination of at least two of:

a source IP address, a destination IP address, an IPv6 prefix, a source/destination port number, a Protocol ID of the protocol above IP/Next header type, Type of Service (TOS) (IPv4)/Traffic class (IPv6) and Mask, Flow Label (IPv6), security parameter index, or Packet Filter direction.

13. The remote UE of claim 12, wherein the source IP address or IPv6 prefix is the IP address or IPv6 prefix of the Remote UE, and the destination IP address or IPv6 prefix is the IP address or IPv6 prefix of the Relay UE.

* * * * *